United States Patent
Russart et al.

(10) Patent No.: US 12,509,719 B2
(45) Date of Patent: Dec. 30, 2025

(54) CELL-FREE METHOD OF PRODUCING SYNTHETIC CIRCULAR NUCLEIC ACID

(71) Applicant: Aldevron, L.L.C., Fargo, ND (US)

(72) Inventors: Nathan Russart, Fargo, ND (US); Venkata Indurthi, Fargo, ND (US); Denis Arutyunov, Fargo, ND (US)

(73) Assignee: Aldevron, L.L.C., Fargo, ND (US)

( * ) Notice: Subject to any disclaimer, the term of this patent is extended or adjusted under 35 U.S.C. 154(b) by 0 days.

(21) Appl. No.: 19/041,629

(22) Filed: Jan. 30, 2025

(65) Prior Publication Data

US 2025/0207185 A1 Jun. 26, 2025

Related U.S. Application Data

(63) Continuation of application No. PCT/US2023/030237, filed on Aug. 15, 2023.

(60) Provisional application No. 63/398,354, filed on Aug. 16, 2022.

(51) Int. Cl.
*C12Q 1/6855* (2018.01)
*C12Q 1/25* (2006.01)
*C12Q 1/48* (2006.01)
*C12Q 1/533* (2006.01)

(52) U.S. Cl.
CPC .......... *C12Q 1/6855* (2013.01); *C12Q 1/25* (2013.01); *C12Q 1/485* (2013.01); *C12Q 1/533* (2013.01)

(58) Field of Classification Search
CPC ............... C12Q 1/6855; C12Q 1/6806; C12Q 2521/501; C12Q 2525/307; C12Q 2527/15; C12Q 2527/137; C12Q 2527/149; C12Q 2531/125
See application file for complete search history.

(56) References Cited

U.S. PATENT DOCUMENTS

| | | |
|---|---|---|
| 8,034,568 B2 | 10/2011 | Kurn et al. |
| 2006/0057683 A1 | 3/2006 | Hyman |
| 2006/0289254 A1 | 12/2006 | Tsukagoshi |
| 2008/0305142 A1 | 12/2008 | Chen et al. |
| 2010/0055744 A1 | 3/2010 | Nelson et al. |
| 2013/0203121 A1 | 8/2013 | Rehberger et al. |
| 2017/0321263 A1 | 11/2017 | Su'etsugu et al. |
| 2019/0203282 A1 | 7/2019 | Touchlight et al. |
| 2020/0048620 A1 | 2/2020 | Zheng et al. |
| 2020/0181587 A1 | 6/2020 | Klausing et al. |
| 2020/0208126 A1 | 7/2020 | Zhang et al. |
| 2021/0002667 A1 | 1/2021 | Schnepp et al. |
| 2021/0254078 A1 | 8/2021 | Hogan et al. |
| 2021/0330817 A1 | 10/2021 | Schnepp et al. |
| 2023/0011323 A1 | 1/2023 | Castillo et al. |
| 2023/0075380 A1 | 3/2023 | Santamarina |
| 2023/0270888 A1 | 8/2023 | Schnepp et al. |
| 2023/0323343 A1 | 10/2023 | Oyarzabal Santamarina |
| 2024/0076659 A1 | 3/2024 | Picher et al. |
| 2024/0139345 A1 | 5/2024 | Huh et al. |
| 2024/0209362 A1 | 6/2024 | Lanckriet et al. |
| 2025/0051817 A1 | 2/2025 | Suetsugu et al. |

FOREIGN PATENT DOCUMENTS

| | | | |
|---|---|---|---|
| EP | 1885880 B1 | 2/2008 | |
| EP | 2601312 B1 | 4/2017 | |
| EP | 2971070 B1 | 4/2018 | |
| EP | 3460058 A1 | 3/2019 | |
| EP | 3150722 B1 | 9/2019 | |
| EP | 3591051 A1 | 1/2020 | |
| EP | 3617308 A1 | 3/2020 | |
| EP | 3222717 B1 | 4/2020 | |
| EP | 3650543 A1 | 5/2020 | |
| EP | 3030682 B1 | 6/2020 | |
| EP | 3500682 B1 | 7/2020 | |
| EP | 3702471 A1 | 9/2020 | |
| EP | 4166659 A1 | 4/2023 | |
| WO | WO 2006/063355 A2 | 6/2006 | |
| WO | WO 2007/018744 A2 | 2/2007 | |
| WO | WO 2010/026099 A1 | 3/2010 | |
| WO | WO 2011/128444 A2 | 10/2011 | |
| WO | WO 2017/109262 A1 | 6/2017 | |
| WO | WO 2018/109206 A1 | 6/2018 | |
| WO | WO-2019178500 A1 * | 9/2019 | ........... A61K 31/713 |
| WO | WO 2021/055760 A1 | 3/2021 | |
| WO | WO 2021/163052 A2 | 8/2021 | |
| WO | WO 2023/023285 A2 | 2/2023 | |

OTHER PUBLICATIONS

Thorsten L. Schmidt et al., "Scalable amplification of strand subsets from chip-synthesized oligonucleotide libraries," *Nature Communications*, vol. 6, Nov. 16, 2015 (Nov. 16, 2015), p. 8634, XP055347700, DOI:10.1038/ncomms9634.

T. Huovinen et al., Primer Extension Mutagenesis Powered by Selective Rolling Circle Amplification, Published: Feb. 15, 2012, Web page <https://doi.org/10/1371/journal.pone.0031817>.

\* cited by examiner

*Primary Examiner* — Angela M. Bertagna
(74) *Attorney, Agent, or Firm* — Frost Brown Todd LLP; Nicole M. Tepe

(57) ABSTRACT

The present disclosure relates to a process of cell-free circular nucleic acid amplification using rolling circle amplification.

13 Claims, 11 Drawing Sheets

Figure 1:
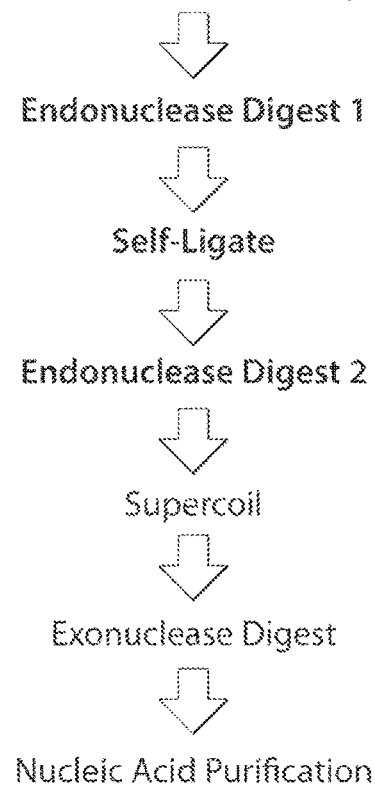

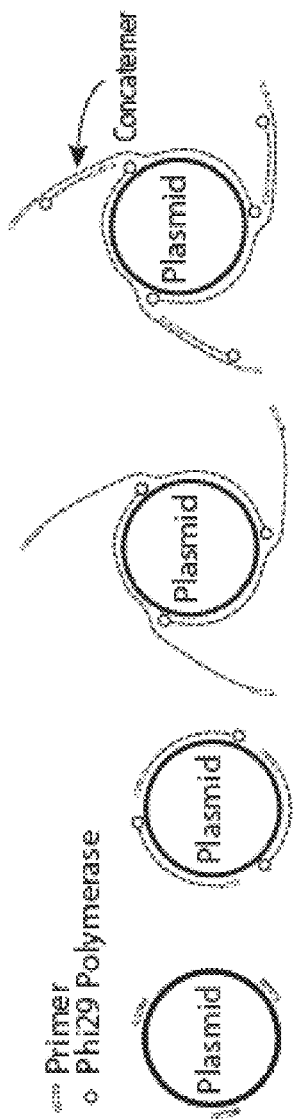
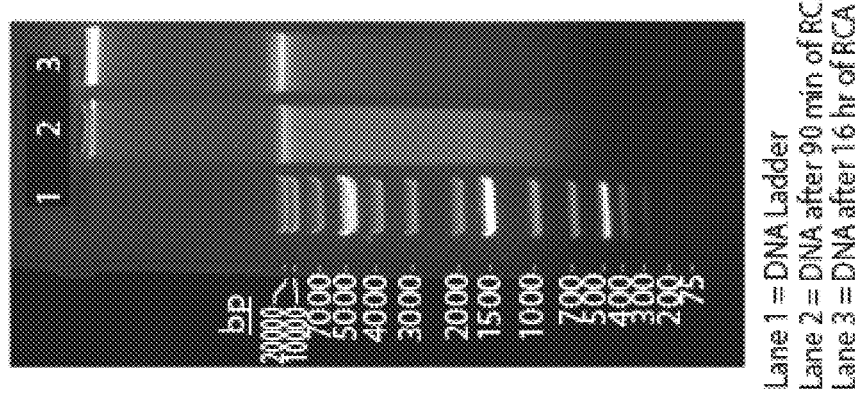
FIG. 2A
FIG. 2B
Lane 1 = DNA Ladder
Lane 2 = DNA after 90 min of RCA
Lane 3 = DNA after 16 hr of RCA Nucleic acid template RCA amplification product RCA amplification product digested with RE1 (first digestion product)

First digestion product ligated with a Ligase enzyme (ligation product)

*Ligation product*

*Ligation product digested with RE2* (second digestion product)

Second digestion product contacted with topoisomerase (supercoiled product)

Supercoiled product contacted with exonuclease (exonuclease product)

CELL-FREE METHOD OF PRODUCING SYNTHETIC CIRCULAR NUCLEIC ACID

PRIORITY STATEMENT

This application is a continuation of PCT/US2023/030237 filed Aug. 15, 2023, now WO 2024/039652, published Feb. 22, 2024, which claims the priority to U.S. Provisional Pat. App. No. 63/398,354, filed Aug. 16, 2022.

FIELD

The present disclosure relates to a process of cell-free circular nucleic acid amplification.

BACKGROUND

Synthetic nucleic acid (NA) molecules have become increasingly useful in biomedical research, medicine, and therapeutics since their development. The use of these molecules is applied in many fields and permits, for example, the ability to combine specialized sequences from different organisms to generate constructs that exhibit particular advantages and utility. For instance, certain sequences that are found in bacteria or viruses can help to enhance expression of mammalian genes. By generating a synthetic NA molecule containing such a bacterial or viral sequence and a mammalian gene on the same construct, it is possible to enhance gene expression levels to those otherwise normally unreachable in mammalian cells, even to possible therapeutic doses. Furthermore, the ability to synthesize NA molecules allows for excellent precision in generating molecules with specialized sequences, such as specific gene variants, polymorphisms, or mutations.

Current methods of generating useful quantities of synthetic NA molecules, such as for use in the laboratory or as therapeutics, require the use of non-mammalian cell systems. However, while these methods allow for production of adequate quantities of synthetic NA molecules, the resulting NA molecules often contain impurities resulting from the cell system in which they were amplified. In addition, it is difficult to control fidelity and expression, and these methods require expensive, specialized equipment.

SUMMARY

The present disclosure provides cost-effective methods by which NA can be highly amplified in a synthetic, cell-free environment, allowing for tight control of amplification and processing reactions, and eliminating the concerns involved in cell-mediated NA amplification.

In some aspects, provided herein are methods of amplifying synthetic circular nucleic acids. The methods include providing a circular nucleic acid template comprising (i) a backbone, wherein the backbone comprises one or more internal endonuclease cut sites, and (ii) an insert sequence, wherein the insert sequence comprises endonuclease cut sites on its 5' and 3' terminal ends; or providing a circular nucleic acid template comprising (i) an insert sequence, wherein the insert sequence is flanked by first endonuclease cut sites; and (ii) a backbone, wherein the backbone comprises one or more second internal endonuclease cut site(s). The methods further include amplifying the circular nucleic acid template to produce an amplification product; contacting the amplification product with a first endonuclease under conditions for digestion, thereby producing a first digestion product; adding the first digestion product to a ligation reaction mixture comprising a ligase enzyme; and incubating the ligation reaction mixture, thereby producing a circular ligation product, wherein the circular ligation product is at least partially supercoiled.

In some embodiments, the backbone comprises more than one internal endonuclease cut sites.

In some embodiments, the backbone comprises two or more different internal endonuclease cut sites.

In some embodiments, the backbone comprises between 1 and 5 internal endonuclease cut sites.

In some embodiments, the endonuclease cut sites flanking the insert sequence are the same endonuclease cut sites.

In some embodiments, the endonuclease cut sites flanking the insert sequence are different from one another.

In some embodiments, the first digestion product is added to the ligation reaction mixture at a rate of about 1% to about 20% of a final ligation reaction volume per hour over a 5-14-hour period.

In some embodiments, the first digestion product is added to the ligation reaction mixture at a rate of about 3% to about 5% of a final ligation reaction volume per hour over a 5-14-hour period.

In some embodiments, the first digestion product is added to the ligation reaction mixture at a rate of about 1% to about 20% of a final ligation reaction volume per hour over a 10-12-hour period.

In some embodiments, the first digestion product is added to the ligation reaction mixture at a rate of about 3% to about 5% of a final ligation reaction volume per hour over a 10-12-hour period.

In some embodiments, the circular ligation product is contacted to a second endonuclease under conditions for digestion, thereby producing a second digestion product, wherein the first and second endonucleases do not have the same recognition site.

In some embodiments, the methods further include contacting the circular ligation product or the second digestion product with a topoisomerase under conditions that promote supercoiling, thereby producing a supercoiled product.

In some embodiments, the methods further include contacting the ligation product, the second digestion product or the supercoiled product with an exonuclease that digests single-stranded nucleic acid and open circle nucleic acid, thereby producing a final reaction product comprising synthetic circular nucleic acid that is substantially free of linear nucleic acid.

In some embodiments, the methods further include purifying the circular ligation product, the second digestion product, the supercoiled product, or the final reaction product. In some embodiments, the final reaction product is purified by chromatography, such as ion-exchange chromatography including anion exchange chromatography, affinity chromatography, reverse-phase chromatography, or size exclusion chromatography, isopropanol precipitation, methanol precipitation, ethanol precipitation, solid phase purification, electrophoresis, or combinations thereof. In some embodiments, the final reaction product is purified by anion exchange chromatography.

In some embodiments, the methods further include deactivating the first and/or second endonucleases by decreasing the pH of the solution to a pH between 3-5 following digestion by the first endonuclease and/or digestion by the second endonuclease. In some embodiments, the methods further include deactivating the first and/or second endonucleases by decreasing the pH to between 3-5 following the step of amplifying the circular nucleic acid template by rolling circle amplification, thereby producing an amplification product.

In some embodiments, the nucleic acid template comprises: a nucleic acid fragment to be amplified; two recognition sites of the first endonuclease at the 5' and 3' ends of the nucleic acid fragment to be amplified, respectively, and a recognition site of the second endonuclease in the vector backbone. In some embodiments, the nucleic acid template further comprises a vector backbone.

In some embodiments, the rolling circle amplification is performed using a Phi29 DNA polymerase. In some embodiments, the rolling circle amplification is performed using a bacterial DNA polymerase III. In some embodiments, the rolling circle amplification is performed using a bacterial DNA polymerase I. In some embodiments, the rolling circle amplification is performed using a modified DNA polymerase I. In some embodiments, the rolling circle amplification is performed using a M2 DNA polymerase. In some embodiments, the rolling circle amplification is performed using a B103 DNA polymerase. In some embodiments, the rolling circle amplification is performed using a GA-1 DNA polymerase. In some embodiments, the rolling circle amplification is performed using a phi-PRD1 polymerase. In some embodiments, the rolling circle amplification is performed using a VENT DNA polymerase. In some embodiments, the rolling circle amplification is performed using a DEEP VENT DNA polymerase. In some embodiments, the rolling circle amplification is performed using a KlenTaq DNA polymerase. In some embodiments, the rolling circle amplification is performed using a Klenow fragment of DNA polymerase I. In some embodiments, the rolling circle amplification is performed using a DNA polymerase III. In some embodiments, the rolling circle amplification is performed using a T3 DNA polymerase. In some embodiments, the rolling circle amplification is performed using a T4 DNA polymerase. In some embodiments, the rolling circle amplification is performed using a T5 DNA polymerase. In some embodiments, the rolling circle amplification is performed using a T7 DNA polymerase. In some embodiments, the rolling circle amplification is performed using a Bst polymerase. In some embodiments, the rolling circle amplification is performed using a rBST DNA polymerase. In some embodiments, the rolling circle amplification is performed using a N29 DNA polymerase. In some embodiments, the rolling circle amplification is performed using a TopoTaq DNA polymerase. In some embodiments, the rolling circle amplification is performed using a T7 RNA polymerase. In some embodiments, the rolling circle amplification is performed using a SP6 RNA polymerase. In some embodiments, the rolling circle amplification is performed using a T3 RNA polymerase. In some embodiments, the rolling circle amplification is performed using a Reverse Transcriptase.

In some embodiments, the ligase is a T4 DNA ligase. In some embodiments, the ligase is a T4 RNA Ligase. In some embodiments, the ligase is a T3 DNA Ligase. In some embodiments, the ligase is a T7 DNA Ligase. In some embodiments, the ligase is a Taq DNA Ligase. In some embodiments, the ligase is an *E. coli* DNA Ligase.

In some embodiments, the topoisomerase is a DNA gyrase. In some embodiments, the DNA gyrase is *E. coli* DNA gyrase. In some embodiments, the DNA gyrase is an *S. aureus* DNA Gyrase. In some embodiments, the DNA gyrase is a DNA topoisomerase 2-alpha. In some embodiments, the DNA gyrase is a DNA topoisomerase 2-beta.

In some embodiments, the exonuclease is a T5 exonuclease. In some embodiments, the exonuclease is an Exonuclease I. In some embodiments, the exonuclease is an Exonuclease II. In some embodiments, the exonuclease is an Exonuclease III. In some embodiments, the exonuclease is an Exonuclease IV. In some embodiments, the exonuclease is an Exonuclease V. In some embodiments, the exonuclease is an Exonuclease VIII. In some embodiments, the exonuclease is an Exonuclease T. In some embodiments, the exonuclease is a Lambda Exonuclease. In some embodiments, the exonuclease is a T7 Exonuclease.

In some embodiments, the first endonuclease or the second endonuclease is a Type I restriction endonuclease. In some embodiments, the first endonuclease or the second endonuclease is a Type II restriction endonuclease. In some embodiments, the first endonuclease or the second endonuclease is a Type IIs restriction endonuclease. In some embodiments, the first endonuclease or the second endonuclease is a Type III restriction endonuclease. In some embodiments, the first endonuclease or the second endonuclease is an Endonuclease III. In some embodiments, the first endonuclease or the second endonuclease is an Endonuclease IV. In some embodiments, the first endonuclease or the second endonuclease is an Endonuclease V. In some embodiments, the first endonuclease or the second endonuclease is an Endonuclease VIII. In some embodiments, the first endonuclease or the second endonuclease is a T7 Endonuclease I. In some embodiments, the first endonuclease or the second endonuclease is a T4 Endonuclease V. In some embodiments, the first endonuclease or the second endonuclease is a T4 Endonuclease VII. In some embodiments, the first endonuclease or the second endonuclease is a Deoxyribonuclease I. In some embodiments, the first endonuclease or the second endonuclease is a Deoxyribonuclease II. In some embodiments, the first endonuclease or the second endonuclease is a Deoxyribonuclease III. In some embodiments, the first endonuclease or the second endonuclease is a Deoxyribonuclease IV. In some embodiments, the first endonuclease or the second endonuclease is an RNA endonuclease. In some embodiments, the first endonuclease or the second endonuclease is an engineered RNA endonuclease with customized sequence specificities. In some embodiments, the first endonuclease or the second endonuclease is an RNA-directed endonuclease. In some embodiments, the first endonuclease or the second endonuclease is a CRISPR/Cas endonuclease. In some embodiments, the first endonuclease or the second endonuclease is Cas9. In some embodiments, the first endonuclease or the second endonuclease is Cpf1.

Another aspect provides a synthetic circular nucleic acid produced by the methods provided herein.

In some embodiments, provided herein are cells comprising the synthetic circular nucleic acid produced by the methods provided herein. In some embodiments, the cells are mammalian cells. In some embodiments, the cells are human cells.

In some embodiments, provided herein are delivery agents comprising the synthetic circular nucleic acids produced by the methods described herein, wherein the delivery agent comprises a lipid, a peptide, a protein, an antibody, a carbohydrate, a nanoparticle, or a microparticle. In some embodiments, the nanoparticle or microparticle is a lipid nanoparticle or a lipid microparticle, a polymer nanoparticle or a polymer microparticle, a protein nanoparticle or a protein microparticle, or a solid nanoparticle or a solid microparticle.

In some embodiments, provided herein are compositions comprising the synthetic circular nucleic acid produced by the methods provided herein, wherein the composition further comprises a pharmaceutically acceptable excipient. In some embodiments, the composition further comprises an additional agent. In some embodiments, the additional agent has a therapeutic effect when administered to a subject. In some embodiments, the additional agent is a nucleotide, a nucleic acid, an amino acid, a peptide, a protein, a small molecule, an aptamer, a lipid, or a carbohydrate. In some embodiments, the compositions are for use in the prevention or treatment of a disease or disorder in a subject in need thereof.

In some embodiments, provided herein are methods comprising introducing the synthetic circular nucleic acid produced by the methods provided herein into a cell. In some embodiments, the method comprises introducing the synthetic circular nucleic acid to a subject. In some embodiments, the subject is a human. In some embodiments, the method comprises prevention or treatment of a disease in a subject in need thereof. These and other aspects of the disclosure are further described below.

BRIEF DESCRIPTIONS OF THE DRAWINGS

The following drawings form part of the present specification and are included to further demonstrate certain aspects of the present disclosure, which can be better understood by reference to one or more of these drawings in combination with the detailed description of specific embodiments presented herein. It is to be understood that the data illustrated in the drawings in no way limit the scope of the disclosure.

FIG. 1 depicts a stepwise overview of the NA amplification method described herein, beginning with rolling circle amplification (RCA). This is followed by a first endonuclease digestion, self-ligation, and a second endonuclease digestion. In some embodiments, the second endonuclease digestion product is further processed via NA supercoiling, exonuclease digestion, and purification by methods such as column chromatography or isopropanol precipitation.

FIGS. 2A-2B demonstrate the rolling circle amplification (RCA) step of the methods provided herein. FIG. 2A depicts a schematic of the method of RCA, which is the first step of the disclosed methods. RCA is carried out to amplify the circular NA template containing both the desired expression cassette insert and vector backbone, resulting in long, linear concatemers having a plurality of copies of the insert. FIG. 2B shows the results of performing RCA on a plasmid for 90 minutes (Lane 2) and for 16 hours (Lane 3). Lane 1 shows a DNA ladder for size reference. Numbers shown to the left side of the gel indicate the length of each corresponding ladder band in base pairs (bp).

Figure 3A:

FIGS. 3A-3D show the processes of a first endonuclease digestion (FIG. 3C) and ligation (FIG. 3D) of the RCA amplification product (FIG. 3B) produced from the nucleic acid template (FIG. 3A). Through these steps, circular NA molecules may be generated comprising only the expression cassette insert, which, in some embodiments, is the desired final product. FIG. 3E shows the products of the first digestion (Lane 2) and SCAM ligation (Lane 3) run on a DNA gel. Lanes 1 and 2 show linear and supercoiled DNA ladders, respectively, for size reference.

Figure 4A:
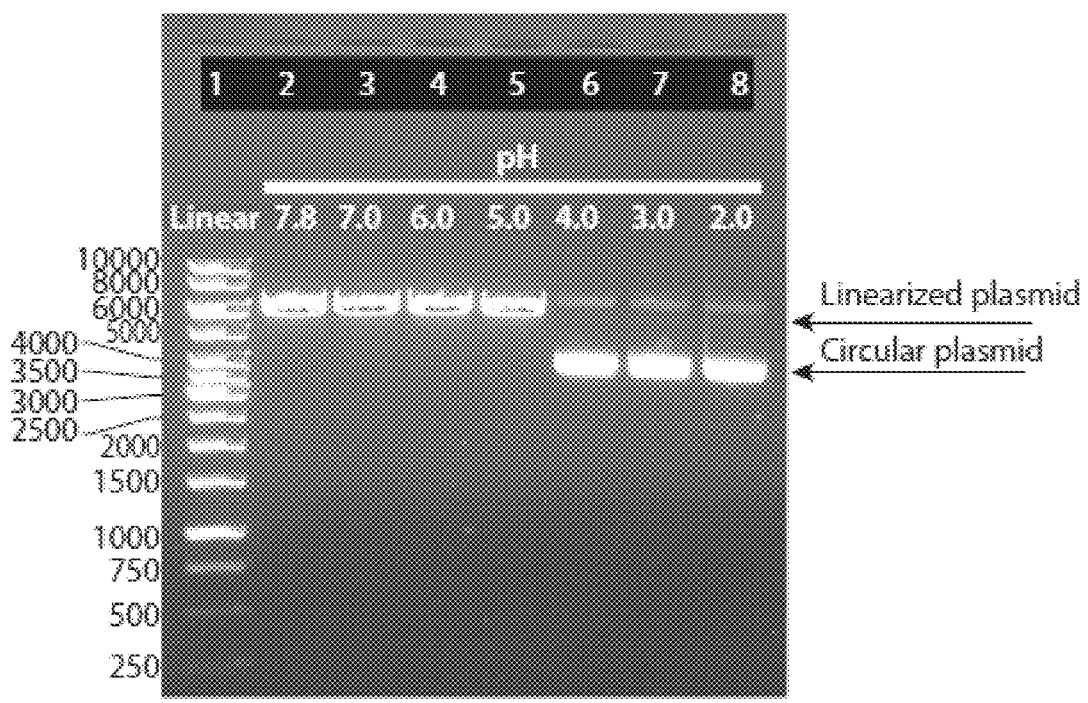
Figure 4B:
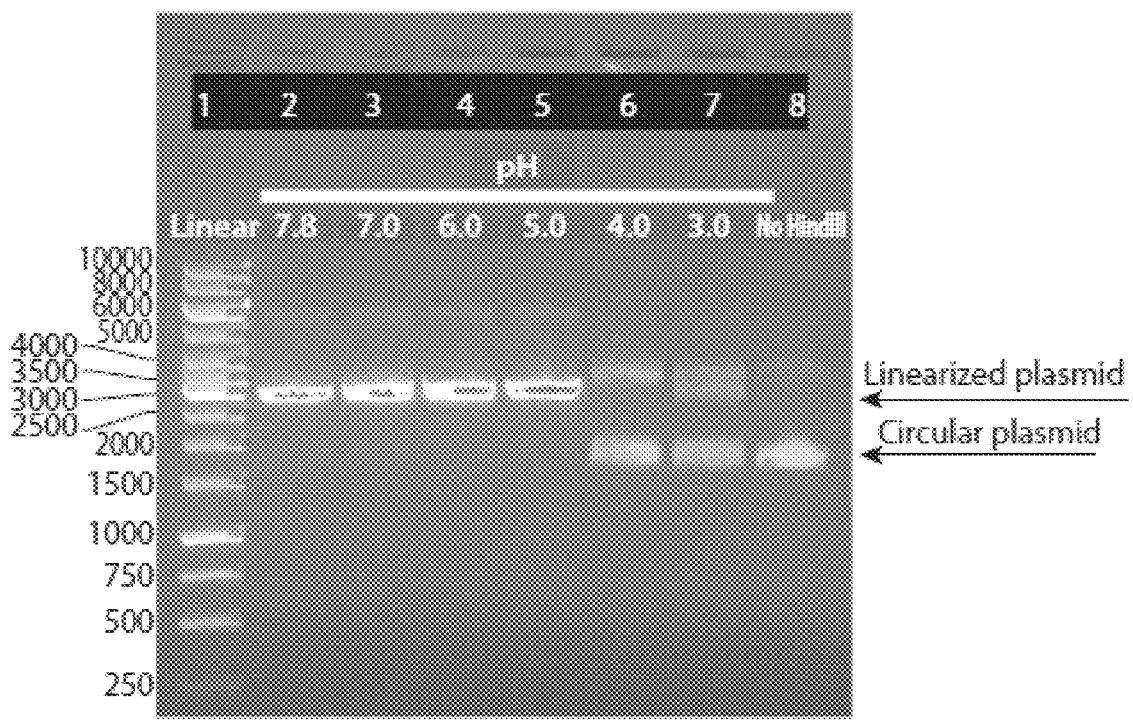
Figure 4C:
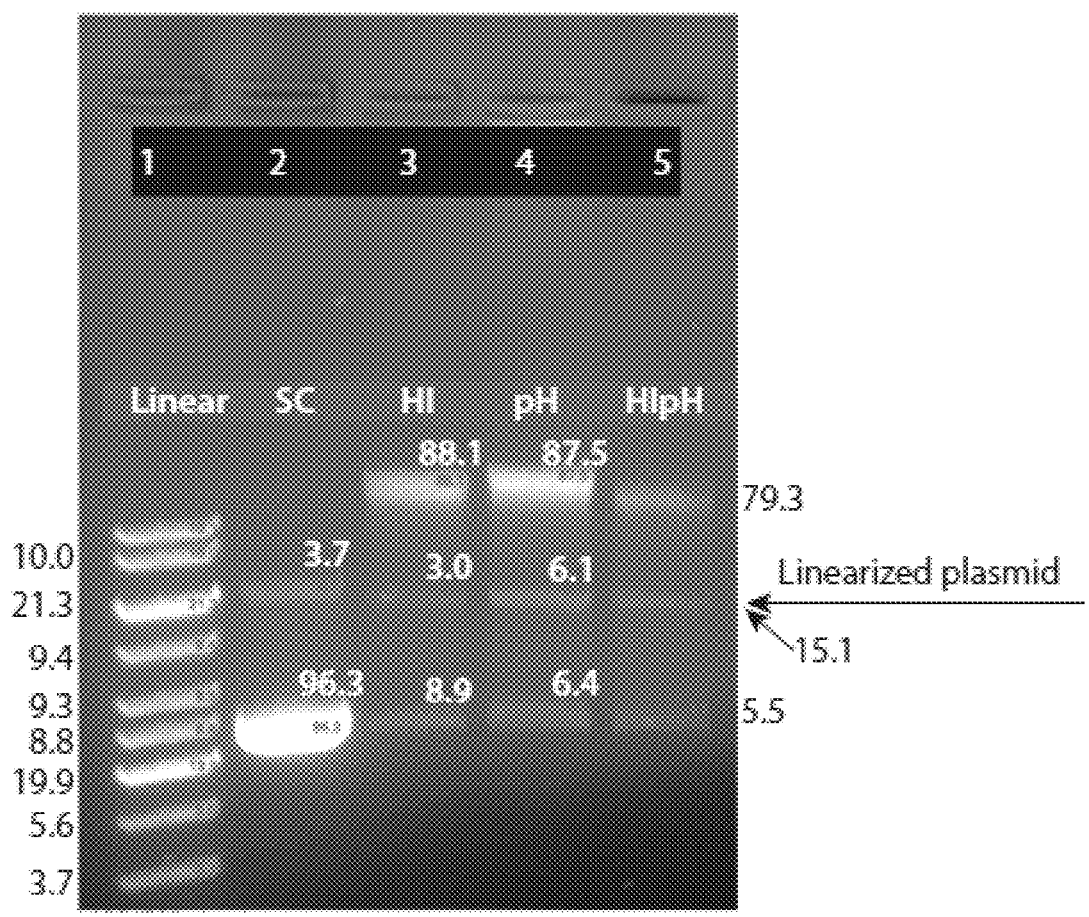

FIGS. 4A-4C show the results of altering the pH of the common reaction buffer on the activity of endonuclease enzymes. In FIG. 4A, Lane 1 shows a linear DNA ladder, and Lanes 2-8 show pH values of 7.8, 7.0, 6.0, 5.0, 4.0, 3.0, and 2.0, respectively. Numbers shown to the left side of the gel indicate the length of each corresponding ladder band in base pairs (bp). In FIG. 4B, Lane 1 shows a linear DNA ladder, Lanes 2-7 show pH values of 7.8, 7.0, 6.0, 5.0, 4.0, and 3.0, respectively, and Lane 8 shows a control in which no HindIII enzyme was added to the reaction. Numbers shown to the left side of the gel indicate the length of each corresponding ladder band in base pairs (bp). FIG. 4C shows the results of an experiment in which supercoiled DNA (SC) was contacted with HindIII after it was inactivated through 3 different methods: heat inactivation (HI), pH inactivation (pH), or a combination of heat and pH (HIpH). The solutions were then fed into ligation reactions containing T4 DNA Ligase and incubated overnight at room temperature before running the products on a gel. Lane 1 shows a DNA ladder, Lane 2 shows the control untreated SC DNA, and Lanes 3-5 show the HI, pH, and HIpH samples, respectively. Numbers shown to the left side of the gel indicate the length of each corresponding ladder band in kilobases (kb). The numbers corresponding to the experimental bands indicate the intensity readings of each band.

Figure 5A:
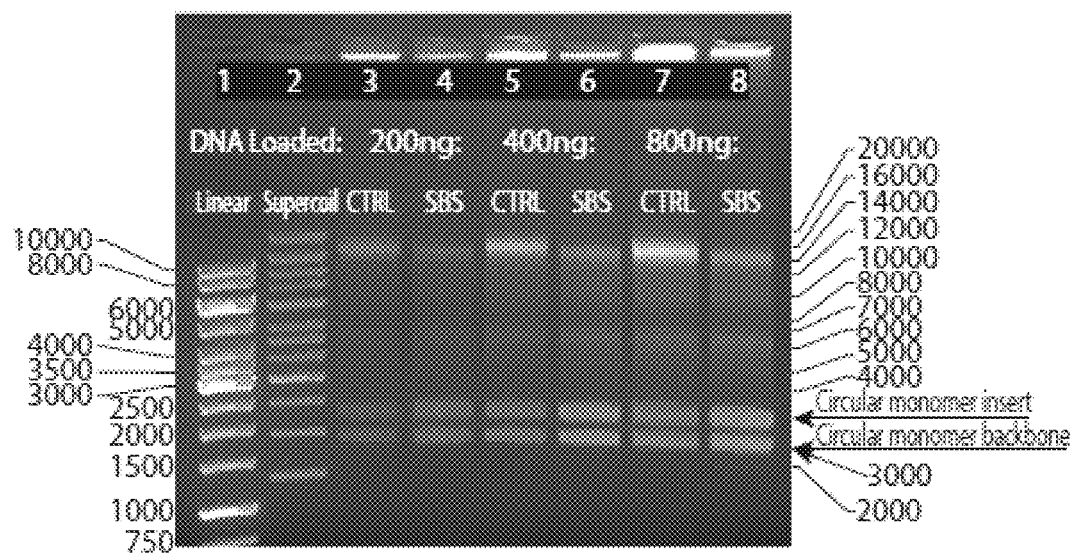
Figure 5B:
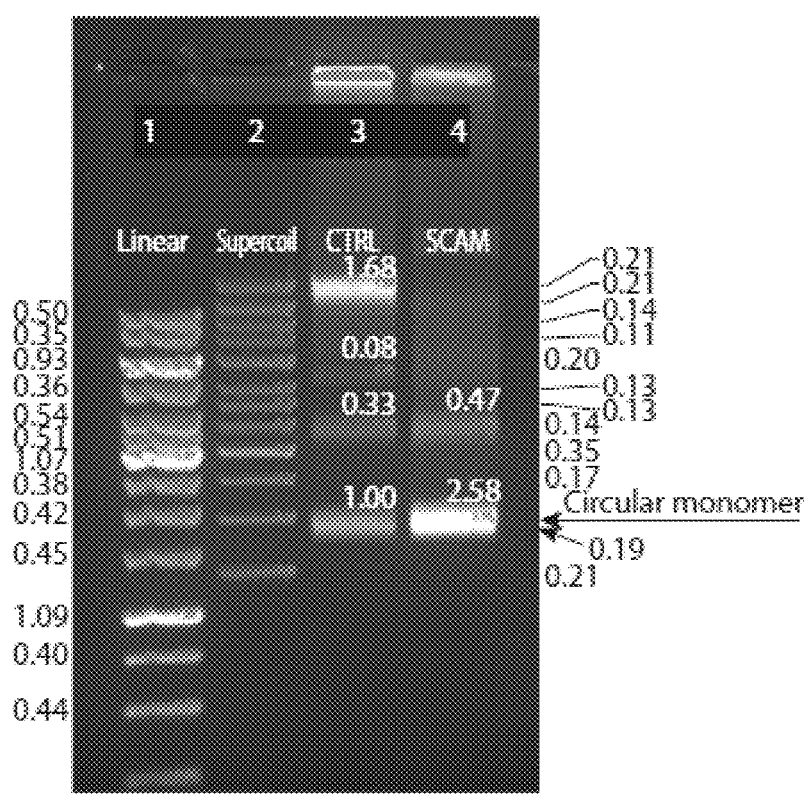

FIGS. 5A-5B demonstrate the beneficial effect of utilizing a substrate continually added method (SCAM) to produce higher amounts of circular monomers during the ligation reaction. In FIG. 5A, Lanes 1 and 2 show linear and supercoiled DNA ladders, respectively. Numbers shown to the left and right sides of the gel indicate the length of each corresponding ladder band in base pairs (bp) of the linear (left) and supercoiled (right) ladders. Lanes 3, 5 and 7 show the products from traditional ligation reactions loaded in increasing amounts (200 ng, 400 ng and 800 ng, respectively). Lanes 4, 6 and 8 show the products from SBS ligation loaded in increasing amounts (200 ng, 400 ng and 800 ng, respectively). In FIG. 5B, Lanes 1 and 2 show linear and supercoiled DNA ladders, respectively. Numbers shown to the left and right sides of the gel indicate the length of each corresponding ladder band in kilobases (kb) of the linear (left) and supercoiled (right) ladders. Lane 3 shows the ligation products produced via traditional ligation reaction (CTRL). Lane 4 shows the ligation products produced via SCAM ligation (SCAM). The numbers corresponding to the experimental bands indicate the intensity readings of each band.

Figure 6A:
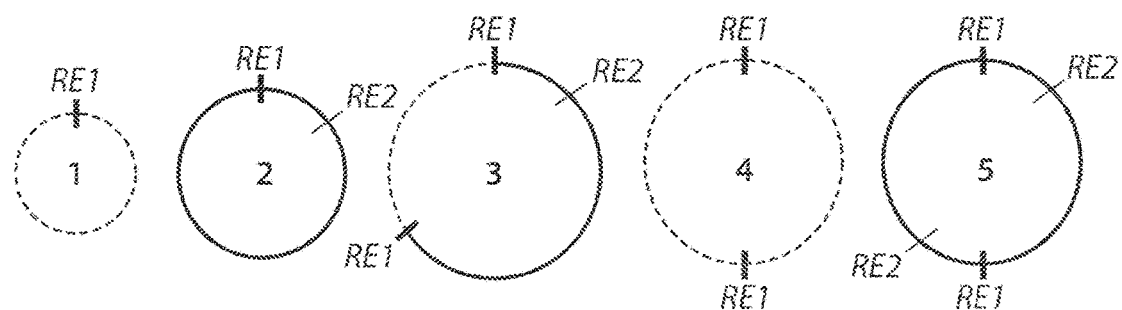
Figure 6B:
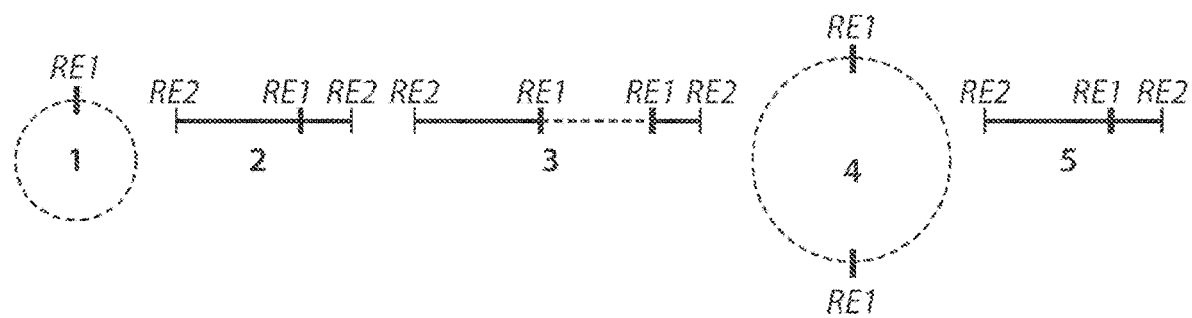
Figure 6C:
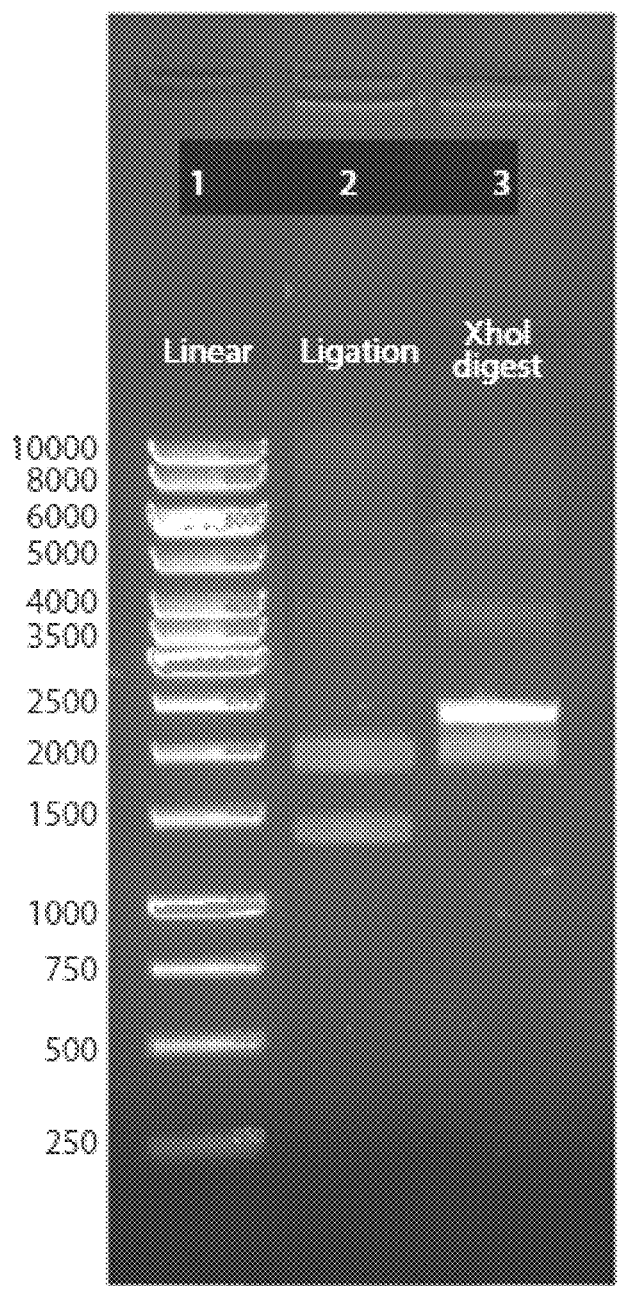

FIGS. 6A-6C demonstrate the ligation step of the methods provided herein. FIG. 6A shows five, non-limiting different possible ligation products that may be produced by the methods provided herein. FIG. 6B shows the products of a second endonuclease digestion that was performed to remove ligation products containing the vector backbone. FIG. 6C shows a DNA gel run to compare sizes of the ligation products before (Lane 2; Ligation) and after (Lane 3; XhoI digest) a second digestion. Lane 1 shows a linear DNA ladder for size reference. Numbers shown to the left side of the gel indicate the length of each corresponding ladder band in base pairs (bp).

Figure 7B:
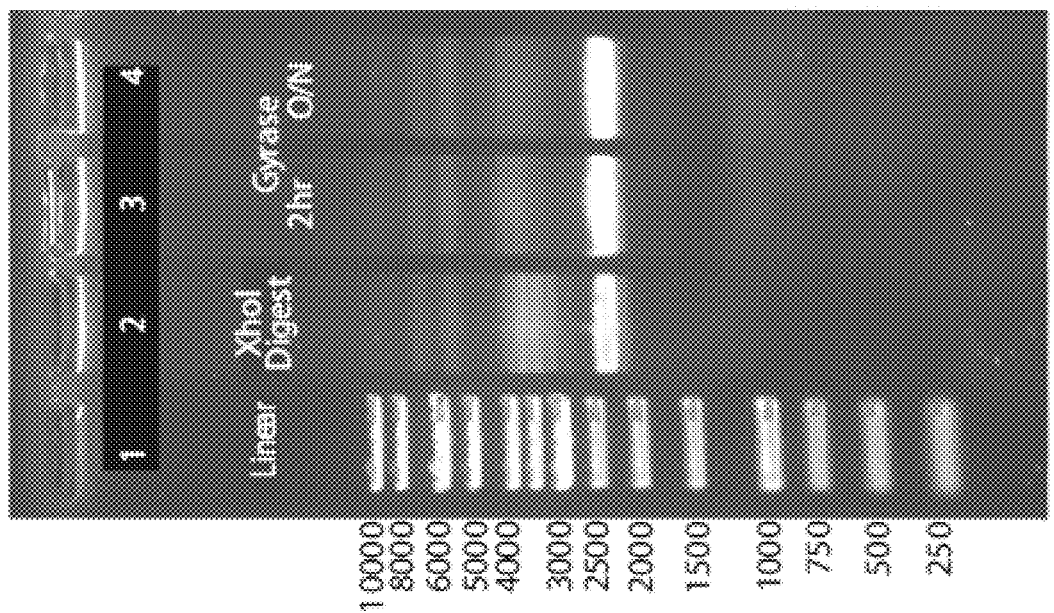
Figure 7A:
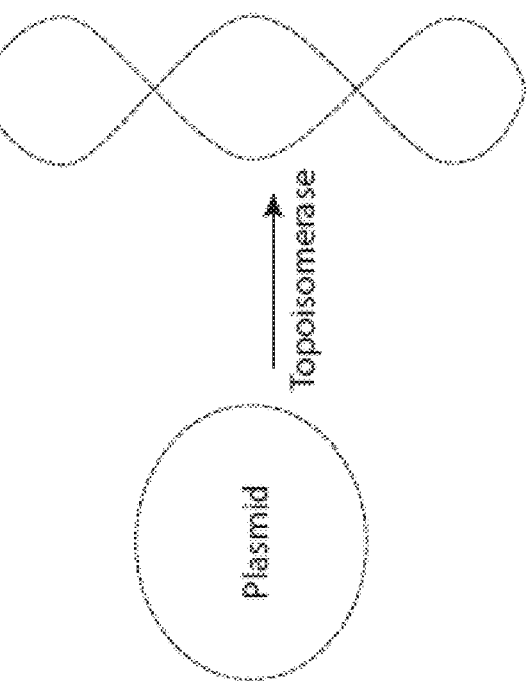

FIGS. 7A-7B demonstrate the supercoiling step of the methods provided herein. FIG. 7A demonstrates how topoisomerase enzymes act to supercoil NAs, resulting in compact NA molecules that migrate quickly through an agarose gel, as their density is increased following supercoiling. In FIG. 7B, Lane 2 shows a vector digested with XhoI (XhoI digest), Lane 3 shows the results of supercoiling the digested vector with DNA Gyrase for 2 hours (2 hr), and Lane 4 shows the results of supercoiling the digested vector with DNA Gyrase overnight (O/N). Lane 1 shows a linear DNA ladder. Numbers shown to the left side of the gel indicate the length of each corresponding ladder band in base pairs (bp).

Figure 8A:
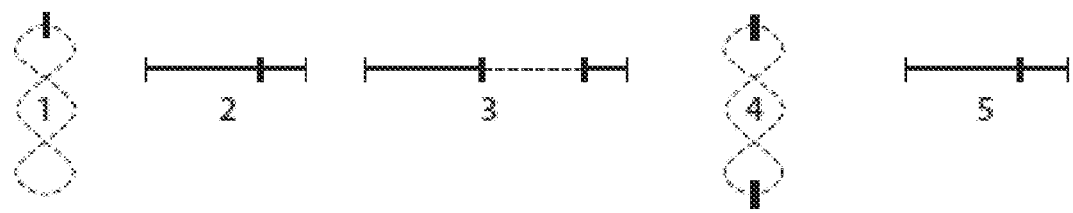
Figure 8B:
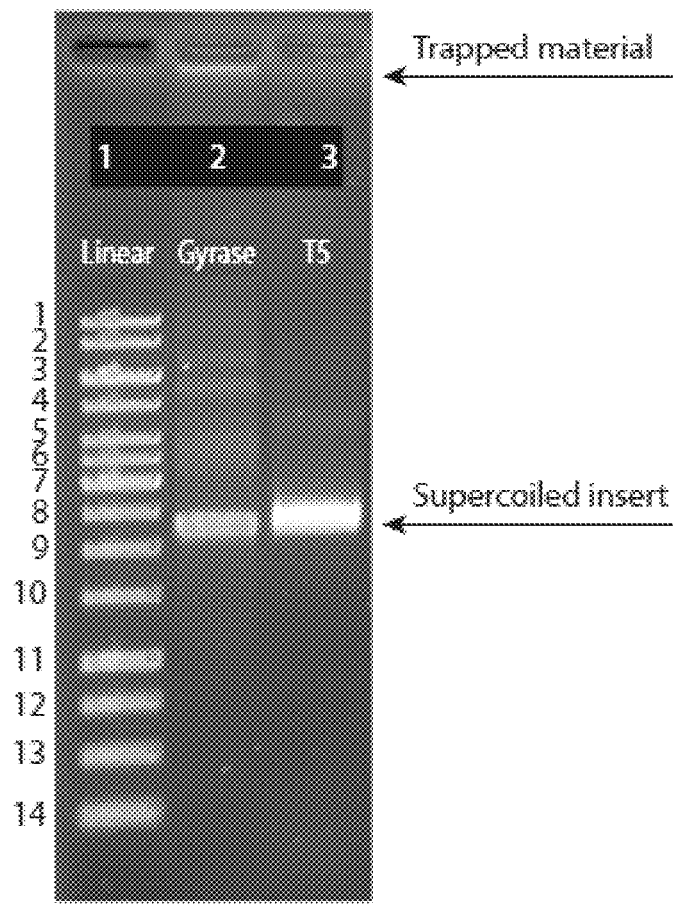

FIGS. 8A-8B demonstrate the exonuclease step of the methods provided herein. FIG. 8A demonstrates the result of contacting products from the second endonuclease digestion with an exonuclease enzyme, which acts to remove linear and open-circle NA. This step allows for further purification of the amplified NA product. In FIG. 8B, Lane 1 shows a linear DNA ladder, Lane 2 shows the result of supercoiling the product of a ligation reaction with DNA Gyrase (Gyrase), and Lane 3 shows the result of contacting the supercoiled product with an exonuclease to remove unwanted NAs (T5). Numbers shown to the left side of the gel indicate each corresponding ladder band (1-14), which match up to the lengths of the DNA ladder bands shown in Lane 1 of FIG. 7B.

Figure 9:
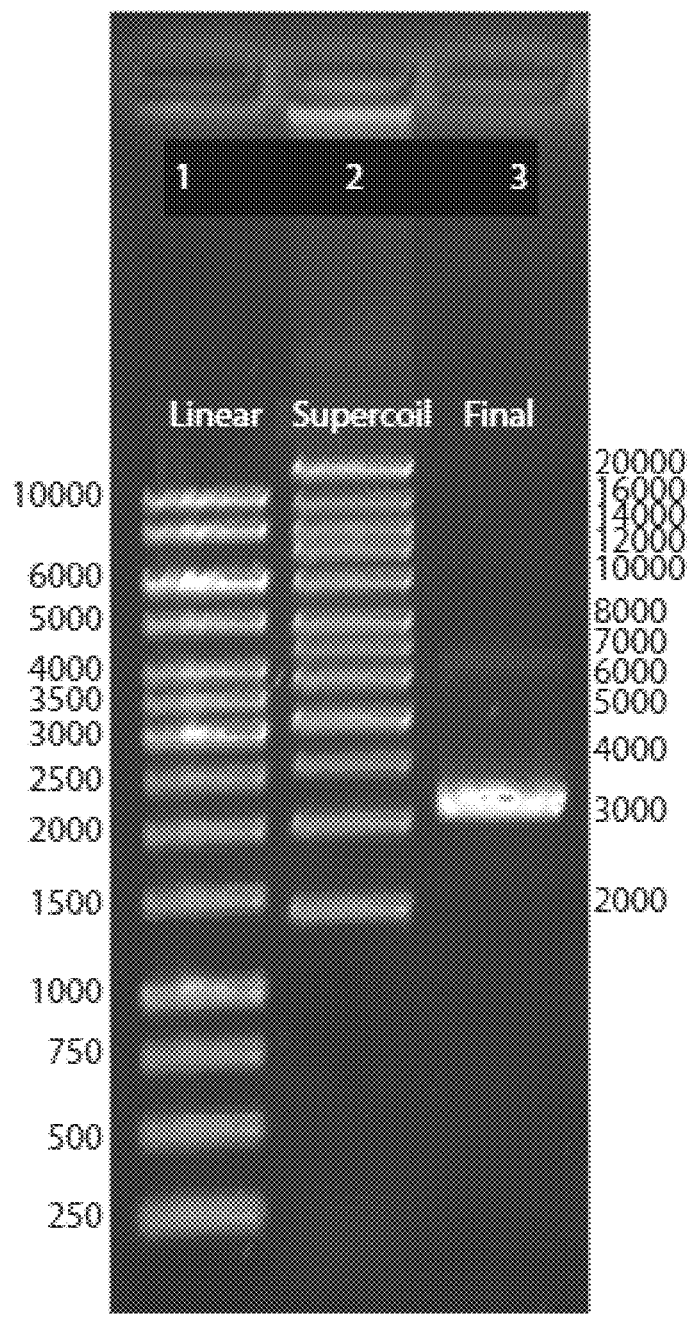

FIG. 9 demonstrates the purity of the final NA product produced using the methods provided herein. Lanes 1 and 2 show linear and supercoiled DNA ladders, respectively, and Lane 3 shows the final NA product after exonuclease digestion and anion-exchange chromatography (Final). Numbers shown to the left side of the gel indicate the length of each corresponding ladder band in base pairs (bp).

DETAILED DESCRIPTION

Traditional cell-based methods for amplifying nucleic acid (NA) in large quantities are costly and often mistake-prone. For example, the use of bacteria to amplify NA requires large volumes of bacterial growth in expensive fermenters that require being maintained in a sterile state so as to prevent contamination of the bacterial culture. The bacteria must also be lysed to release the amplified NA, and the NA must be cleaned and purified from other bacterial components such as endotoxins, which are toxic to mammals. Typical NA purification procedures from bacteria and other cell sources include methods that use organic, mutagenic, and toxic compounds including phenol, ethidium bromide, and cesium chloride, and enzymes such as lysozyme, proteinase K, and RNase A. All these compounds can constitute potential health hazards if injected as contaminants in NA vaccines or other therapeutic NA agents.

In addition to the issues of cost, the use of bacteria can in many cases present difficulties for fidelity of the amplification process. In the complex biochemical environment of the bacterial cell, it is difficult to control the quality and yield of the desired NA product. The bacteria may inadvertently alter the sequence of the amplified NA and render it unusable for its intended purpose. Recombination events may also lead to problems in production of a NA molecule of interest.

In contrast, cell-free (synthetic) NA amplification can provide significant cost savings due to streamlined production and simplified purification. Additionally, it eliminates impurities typically associated with traditional processes as described herein. In particular, cell-free enzymatic processes for the amplification of NA avoid the requirement for use of a host cell, effectively removing the issues associated with cell-based NA amplification. Provided herein are methods for amplifying circular NA molecules in a synthetic manner, allowing for the production of highly pure amplified product through cost-effective and time-efficient means.

Provided herein are methods of amplifying synthetic circular nucleic acid (NA) molecules (e.g., a circular NA vector as described herein). In particular, the methods provided herein involve in vitro synthesis (e.g., in the absence of cells (i.e., cell-free)) of NAs, which provide a purer composition of resulting NA molecules relative to a bacterial- or yeast-derived NAs, and enables faster, more efficient NA synthesis.

In some embodiments, amplification of NA vectors using the methods disclosed herein begins with providing a sample comprising a circular NA. In some embodiments, the circular NA is produced by self-ligation of linear NA. This may be done by any method known in the art, for example, contacting a linear NA with a ligase enzyme under conditions suitable for self-ligation. In some embodiments, the circular NA is DNA. In some embodiments, the circular NA is RNA. In some embodiments, the circular NA includes: 1) an expression cassette having a heterologous gene (i.e., an insert), and 2) a backbone comprising nucleotide sequences providing isolation, expression, and/or amplification properties (i.e., a backbone). In some embodiments, the circular NA is covalently closed. Circular NA vectors can be synthesized in vitro or obtained from a cell using standard NA extraction/isolation techniques well-known in the art. In some embodiments, linear NA is specifically degraded, e.g., using an exonuclease, to purify the circular NA.

In some embodiments, the NA vector is single-stranded. In some embodiments, the NA vector is double-stranded. In some embodiments, the NA vector is supercoiled. In some embodiments, the NA vector is monomeric. In some embodiments, the circular NA vector comprises a promoter sequence upstream of (5' to) the one or more heterologous genes. Additionally, or alternatively, the circular NA vector can include a polyadenylation site downstream of the one or more heterologous genes. Thus, in some embodiments, the circular NA vector comprises the following elements operably linked from 5' to 3' or from 3' to 5': (i) a promoter sequence; (ii) one or more heterologous genes; and (iii) a polyadenylation (poly-A) site (e.g., a site for the addition of a poly-A tail).

In some embodiments, the poly-A tail comprises between 50 and 100, between 100 and 150, between 150 and 200, between 200 and 300, between 300 and 400, or between 400 and 500 nucleotides. In some embodiments, 25-100%, 30-100%, 40-100%, 50-100%, 60-100%, 70-100%, 80-100%, 90-100%, 95-100%, 96-100%, 97-100%, 98-100%, or 99-100% of nucleotides of the poly-A tail are adenosine nucleotides.

In some embodiments, the NA vector comprises two or more heterologous genes. In some embodiments, the two or more heterologous genes comprise more than one of the same gene. As used herein, a "same gene" refers to NA sequences that encode for proteins with the same function and/or structure. In some embodiments, the more than one heterologous genes comprise different genes. As used herein, a "different gene" refers to NA sequences that encode for proteins with different functions and/or structures. In some embodiments, the different genes encode for proteins that interact functionally (e.g., as part of a signaling pathway) or structurally (e.g., through dimerization, e.g., a heavy and light chain of an antibody or fragment thereof), or that do not interact. In some embodiments, the heterologous gene comprises one or more trans-splicing molecules or portions thereof (e.g., a binding domain).

In some embodiments, the NA vector comprising the expression cassette is amplified through rolling circle amplification (RCA) in vitro, in a cell-free preparation, by incubating the NA with a polymerase (e.g., a phage polymerase, e.g., Phi29 DNA polymerase), primers (e.g., specific primers, random primers, e.g., random polymer primers), and a nucleotide mixture (e.g., dNTPs or NTPs, e.g., dATP, dCTP, dGTP, and dTTP or ATP, CTP, GTP, and UTP). In some embodiments, the nucleotide mixture is a natural nucleotide mixture (i.e., substantially devoid of nucleotide analogues).

In other embodiments, the nucleotide mixture includes one or more nucleotide analogues, such as non-natural nucleotides.

In some embodiments, the nucleotide analogue comprises a modified phosphate, resulting in a modified internucleotide linkage when incorporated into the nascent NA. Modified phosphates used in the present invention may be, but are not limited to, phosphorothioate (PS), thiophosphate, 5'-O-methylphosphonate, 3'-O-methylphosphonate, 5'-hydroxyphosphonate, hydroxyphosphanate, phosphoroselenoate, selenophosphate, phosphoramidate, carbophosphonate, methylphosphonate, phenylphosphonate, ethylphosphonate, H-phosphonate, guanidinium ring, triazole ring, boranophosphate (BP), methylphosphonate, and guanidinopropyl phosphoramidate. In some embodiments, more than one modified phosphate is used.

In some embodiments, the nucleotide analogue comprises a modified sugar. Modified sugars used in the present invention may be, but are not limited to, 2'-deoxy fluoro (2FA), L-adenosine (LA), 2'-deoxyadenosine (dA), locked nucleic acid (LNA), 2'-methoxy (2OMe), 2'-methoxyethoxy (2MOE), 2'-thioribose, 2',3'-dideoxyribose, 2'-amino-2'-deoxyribose, 2' deoxyribose, 2'-azido-2'-deoxyribose, 2'-fluoro-2'-deoxyribose, 2'-O-methylribose, 2'-O-methyldeoxyribose, 3'-amino-2',3'-dideoxyribose, 3'-azido-2',3'-dideoxyribose, 3'-deoxyribose, 3'-O-(2-nitrobenzyl)-2'-deoxyribose, 3'-O-methylribose, 5'-aminoribose, 5'-thioribose, 5-nitro-1-indolyl-2'-deoxyribose, 5'-biotin-ribose, 2'-O,4'-C-methylene-linked, 2'-O,4'-C-amino-linked ribose, and 2'-O, 4'-C-thio-linked ribose. In some embodiments, more than one modified sugar is used.

In some embodiments, the nucleotide analogue comprises a modified nucleobase. Modified nucleobases used in the present invention may be, but are not limited to, inosine, xanthine, allyaminouracil, allyaminothymidine, hypoxanthine, digoxigeninated adenine, digoxigeninated cytosine, digoxigeninated guanine, digoxigeninated uracil, 6-chloropurineriboside, N6-methyladenosine, methylpseudouracil, 2-thiocytosine, 2-thiouracil, 5-methyluracil, 4-thiothymidine, 4-thiouracil, 5,6-dihydro-5-methyluracil, 5,6-dihydrouracil, 5-[(3-Indolyl) propionamide-N-allyl]uracil, 5-aminoallylcytosine, 5-aminoallyluracil, 5-bromouracil, 5-bromocytosine, 5-carboxycytosine, 5-carboxymethylesteruracil, 5-carboxyuracil, 5-fluorouracil, 5-formylcytosine, 5-formyluracil, 5-hydroxycytosine, 5-hydroxymethylcytosine, 5-hydroxymethyluracil, 5-hydroxyuracil, 5-iodocytosine, 5-iodouracil, 5-methoxycytosine, 5-methoxyuracil, 5-methylcytosine, 5-methyluracil, 5-propargylaminocytosine, 5-propargylaminouracil, 5-propynylcytosine, 5-propynyluracil, 6-azacytosine, 6-azauracil, 6-chloropurine, 6-thioguanine, 7-deazaadenine, 7-deazaguanine, 7-deaza-7-propargylaminoadenine, 7-deaza-7-propargylaminoguanine, 8-azaadenine, 8-azidoadenine, 8-chloroadenine, 8-oxoadenine, 8-oxoguanine, araadenine, aracytosine, araguanine, arauracil, biotin-16-7-deaza-7-propargylaminoguanine, biotin-16-aminoallylcytosine, biotin-16-aminoallyluracil, cyanine 3-5-propargylaminocytosine, cyanine 3-6-propargylaminouracil, cyanine 3-aminoallylcytosine, cyanine 3-aminoallyluracil, cyanine 5-6-propargylaminocytosine, cyanine 5-6-propargylaminouracil, cyanine 5-aminoallylcytosine, cyanine 5-aminoallyluracil, cyanine 7-aminoallyluracil, dabcyl-5-3-aminoallyluracil, desthiobiotin-16-aminoallyl-uracil, desthiobiotin-6-aminoallylcytosine, isoguanine, N1-ethylpseudouracil, N1-methoxymethylpseudouracil, N1-methyladenine, N1-methylpseudouracil, N1-propylpseudouracil, N2-methylguanine, N4-biotin-OBEA-cytosine, N4-methylcytosine, N6-methyladenine, O6-methylguanine, pseudoisocytosine, pseudouracil, thienocytosine, thienoguanine, thienouracil, xanthosine, 3-deazaadenine, 2,6-diaminoadenine, 2,6-diaminoguanine, 5-carboxamide-uracil, 5-ethynyluracil, N6-isopentenyladenine (I6A), 2-methyl-thio-N6-isopentenyladenine (ms2I6A), 2-methylthio-N6-methyladenine (ms2m6A), N6-(cis-hydroxyisopentenyl)adenine (io6A), 2-methylthio-N6-(cis-hydroxyisopentenyl)adenine (ms2io6A), N6-glycinylcarbamoyladenine (g6A), N6-threonylcarbamoyladenine (t6A), 2-methylthio-N6-threonyl carbamoyladenine (ms2t6A), N6-methyl-N6-threonylcarbamoyladenine (m6t6A), N6-hydroxynorvalylcarbamoyladenine (hn6A), 2-methylthio-N6-hydroxynorvalyl carbamoyladenine (ms2hn6A), N6,N6-dimethyladenine (m62A), and N6-acetyladenine (ac6A). In some embodiments, more than one modified nucleobase is used.

The polymerase amplifies the NA molecule by rolling circle amplification, thereby generating a linear concatemer having a plurality of copies of the NA molecule. Suitable polymerases include thermophilic polymerases, polymerases that feature high processivity through GC-rich sequences, and polymerases with NA displacement capabilities.

The resulting concatemers are digested using an endonuclease (e.g., restriction endonuclease) to cut within the concatemerized NA molecule to generate unit-length linear NA molecules that include the heterologous gene, if present in the NA molecule subjected to the amplification process. Self-ligation of the linear NA molecule (e.g., by the addition of a ligase enzyme) results in a circular, synthetic NA molecule, optionally complete with the heterologous gene. Because the replication and amplification of NA as described herein is feasible using a polymerase in cell-free conditions, the synthetic NA molecule can be isolated from the bacterial components of a plasmid in which it was cloned, thus removing bacterial signatures, such as bacterial CpG motifs and/or dam or dcm methylation, from the isolated vector.

In one aspect, provided herein are cell-free methods of amplifying an isolated NA vector by: (i) providing a sample comprising a circular NA vector comprising an expression cassette, wherein the expression cassette comprises (a) a heterologous gene comprising first endonuclease cut sites on the 5' and 3' ends of the expression cassette, and (b) one or more second endonuclease cut site(s) within the vector backbone; (ii) amplifying the expression cassette using polymerase-mediated RCA, thereby generating a linear concatemer; (iii) digesting the linear concatemer using a first endonuclease to separate the expression cassette from the backbone; and (iv) incubating the expression cassette under conditions permissible for self-ligation, thereby producing a circular ligation product comprising the expression cassette. In some embodiments, the method further comprises digesting the ligation product using a second endonuclease selected to cleave circular NA products comprising the vector backbone, thereby producing a second digestion product. In some embodiments, the method further comprises contacting the ligation product or second digestion product with a topoisomerase enzyme to supercoil the remaining circular NA product, i.e., circular NA products lacking the vector backbone. In some embodiments, the supercoiled NA can be polymeric supercoiled NA. In some embodiments, the supercoiled NA can be monomeric supercoiled NA. In some embodiments, the method further includes purifying the supercoiled product. In some embodiments, the supercoiled produce is purified using column chromatography, electrophoresis, or other methods known in the art. In some embodiments, open relaxed circular NA is separated from supercoiled NA in the purification step.

Aspects of the methods disclosed herein combine several techniques for the purpose of affordably producing large amounts of NA for therapeutic, diagnostic, and research applications. Due to the cell-free nature of the methods disclosed herein, there is no contaminating source of endotoxin other than what is minimally contained in the reagents used. Additional advantages include: the capability of producing large fermentation-like quantities of product in a small laboratory flask; the requirement of only a minimal number of reagents; ability to produce large amounts of product in a relatively short period of time; and streamlined purification procedures.

Synthetic Nucleic Acid Molecules

In one aspect, the methods disclosed herein provide an isolated circular NA (e.g., a circular NA vector), wherein the circular NA lacks: (a) an origin of replication (e.g., a bacterial origin of replication) and/or a drug resistance gene; and (b) a recombination site. For example, in some embodiments, the circular NA lacks an origin of replication, a drug resistance gene, and a recombination site. In some embodiments, the circular NA comprises one or more heterologous genes. In some embodiments, the one or more heterologous genes comprise an open reading frame (ORF). In some embodiments, the one or more heterologous genes encode a protein. In some embodiments, the protein is monomeric (e.g., a monomeric protein with secondary, tertiary, and/or quaternary structure under physiological conditions). In some embodiments, the protein is multimeric (e.g., a dimeric protein (e.g., a homodimeric protein or heterodimeric protein), a trimeric protein, etc.). In some aspects, the heterologous gene encodes one or more proteins (e.g., a single protein, two proteins, three proteins, four proteins, etc.). In such embodiments, the heterologous gene sequence can be a multicistronic sequence or a multi-transcription unit sequence.

In some embodiments, the heterologous gene comprises a spacer. A spacer, as used herein, refers to a nucleotide sequence positioned between coding sequences in a polycistronic locus or polycistronic mRNA to facilitate the translation or processing of the one or more coding sequences in one or more separate proteins. Non-limiting examples of a spacer are internal ribosome entry sites (IRES), self-cleaving peptide coding sequences, and nucleotide sequences encoding an endogenous protease cleavage site. In some embodiments, the spacer is an IRES. An IRES, as used herein, refers to a DNA sequence that, once transcribed into RNA, allows for initiation of translation from an internal region of the RNA (e.g., an mRNA). Translation in eukaryotes usually begins at the 5' cap of the mRNA so that only a single translation event occurs for each mRNA. An IRES, however, can initiate translation independent of the 5' cap and acts as another ribosome recruitment site, thereby resulting in co-expression of one or more proteins from a single mRNA.

In some embodiments, the spacer encodes a self-cleaving peptide, including, without limitation, 2A, E2A, F2A, P2A, and T2A self-cleaving peptides. A self-cleaving 2A peptide, as used herein, refers to a short oligopeptide (usually 19-22 amino acids) located between two proteins in some members of the picornavirus family. The 2A self-cleaving peptide can undergo self-cleavage to generate mature proteins by a translational effect that is known as "stop-go" or "stop-carry" (Wang et al. (2015), Nature Scientific Reports 5:16237). The term "self-cleaving" is a misnomer, as these peptides are thought to function by making the ribosome skip the synthesis of a peptide bond at the C-terminus of a 2A element, leading to separation between the end of the 2A sequence and the next peptide downstream. The "cleavage" occurs between the Glycine and Proline residues found on the C-terminus meaning the upstream cistron will have a few additional residues added to the end, while the downstream cistron will start with the Proline.

In some embodiments, the spacer encodes for a cleave site for protease that is endogenous to the host cell. Non-limiting examples of proteases are trypsin, elastase, matrix metalloproteinases (MMPs), and pepsin.

In some embodiments, the protein is a therapeutic protein. As used herein, a "therapeutic protein" refers to a protein that prevents, reduces, or alleviates one or more signs or symptoms of a disease when expressed in a subject, such as a human subject that has, or is at risk of developing, a disease or disorder. A therapeutic protein may be, for example, an enzyme, clotting factor, a peptide, an interleukin, an allergen, an interferon, a transcription factor, a growth factor, a cytokine, an anti-apoptosis factor, an anti-diabetic factor, a coagulation factor, an enzyme-activating protein, an anti-tumor factor, a pro-apoptosis factor, a chemokine, an antibody (or antibody fragment thereof), a protein hormone, a signaling protein, a structural protein, or a cell surface receptor encoded by a gene that is mutated in a subject. As a non-limiting example, a mutation in a gene encoding such a protein may cause diminished levels of the protein to be expressed in one or more cells of the subject. Expression of the therapeutic protein may therefore compensate for a mutation in the gene encoding such a protein in a subject. In some embodiments, the enzyme is an epigenetic regulator. In some embodiments, the epigenetic regulator is a histone methyltransferase, a histone demethylase, a histone acetylase, a DNA methyltransferase, or a DNA demethylase. In some embodiments, the therapeutic protein is an antigen. In some embodiments, the antigen is a tumor antigen, a viral antigen, a microbial antigen, a bacterial antigen, or a plant antigen. In some embodiments, the therapeutic protein is an antibody, or a portion, fragment, or variant thereof. Antibodies include fragments that are capable of binding to an antigen, such as Fv, single-chain Fv (scFv), Fab, Fab', di-scFv, single domain antibody (sdAb), (Fab')2 (including a chemically linked (Fab')2), NANOBODIES®, chimeric antibodies, and humanized antibodies.

In another aspect, the methods disclosed herein provide a NA vector comprising one or more noncoding heterologous genes. In some embodiments, the noncoding heterologous genes are therapeutic NAs. As used herein, a therapeutic nucleic acid (NA) is a nucleic acid or related compound that alters gene expression to prevent or treat diseases or disorders. In some embodiments, the therapeutic NA is an antisense oligonucleotide (ASO), a DNA aptamer, an RNA aptamer, a ribozyme, an RNA decoy, an siRNA, an shRNA, a miRNA, a gRNA, or a CRISPRi molecule.

In some embodiments, the heterologous gene comprises a reporter sequence in addition to a sequence encoding a protein or therapeutic NA. In some embodiments, reporter genes are used for verifying heterologous gene expression, for example, in specific cells and tissues. Reporter sequences that may be provided in a heterologous gene include, without limitation, DNA sequences encoding β-lactamase, β-galactosidase (LacZ), alkaline phosphatase, thymidine kinase, green fluorescent protein (GFP), chloramphenicol acetyltransferase (CAT), luciferase, and others well known in the art. When associated with regulatory elements which drive their expression, the reporter sequence provides signals detectable by conventional means, including enzymatic, radiographic, colorimetric, fluorescence or other spectrographic assays, fluorescent activating cell sorting assays and immunological assays, including enzyme linked immunosorbent assay (ELISA), radioimmunoassay (RIA), and immunohistochemistry. For example, when the reporter sequence is the LacZ gene, the presence of the LacZ expression product in the presence of appropriate reagents produces a detectable signal. When the reporter sequence expresses green fluorescent protein or luciferase, the presence of the green fluorescent protein or luciferase (with appropriate reagents) produces a detectable signal that may be measured visually by color or light production in a luminometer.

In another aspect, provided herein are NA vectors comprising a promoter sequence upstream of (5' to) the one or more heterologous genes. In some embodiments, the NA vector includes a polyadenylation site downstream of the one or more heterologous genes. In some embodiments of any of the above aspects, the one or more heterologous genes includes a trans-splicing molecule or a portion thereof (e.g., a binding domain). In another aspect, provided herein are isolated circular NA vectors having one or more therapeutic NAs. Such an isolated circular NA vector lacks an origin of replication and/or a drug resistance gene, lacks a recombination site. In some embodiments, the NA vector comprises a terminal repeat sequence. In some embodiments, the terminal repeat sequence is at least 10 base pairs (bp) in length. In some embodiments, the NA vector lacks bacterial plasmid DNA. In some embodiments, the NA vector comprises one or more unmethylated GATC sequences, one or more unmethylated CCAGG sequences, and/or one or more CCTGG sequences. Additionally, or alternatively, the NA vector (a) lacks an immunogenic bacterial signature; (b) lacks an RNA polymerase arrest site; and/or (c) is substantially devoid of CpG islands.

In some embodiments, the NA vectors used herein (e.g., circular NA vectors) comprise conventional control elements which are operably linked to the heterologous gene in a manner which permits transcription, translation, and/or expression in a target cell. Control elements include appropriate transcription initiation, termination, promoter, and enhancer sequences; efficient RNA processing signals such as splicing and polyadenylation (poly-A) signals; sequences that stabilize cytoplasmic mRNA; sequences that enhance translation efficiency (e.g., Kozak consensus sequence); sequences that enhance protein stability; and sequences that enhance secretion of the encoded product. Various control elements, including promoters which are native, constitutive, inducible, and/or tissue-specific, are known in the art and may be utilized. A promoter region is operably linked to a heterologous gene if the promoter region is capable of effecting transcription of that gene such that the resulting transcript can be translated into the desired protein. Promoters useful as part of the NA vectors described herein include constitutive and inducible promoters.

In another aspect, provided herein are isolated linear NA molecules, optionally produced in a cell-free manner, comprising a plurality of identical concatemers, wherein each of the identical concatemers comprises at least one heterologous gene. In some embodiments, the isolated linear NA molecule is DNA. In some embodiments, the isolated linear NA molecule is RNA. In some embodiments, the at least one heterologous gene encodes one or more therapeutic protein. In some embodiments, the isolated linear NA molecule lacks: (a) an origin of replication (e.g., a bacterial origin of replication) and/or a drug resistance gene; and (b) a recombination site. For example, in some embodiments, the isolated linear NA molecule lacks an origin of replication, a drug resistance gene, and a recombination site. In some embodiments, the isolated linear NA molecule comprises endonuclease cut sites. In some embodiments, the endonuclease cut sites are positioned on the 5' and 3' ends of the heterologous gene insert.

In some embodiments, the circular NA provided herein is >250 base pairs. In some embodiments, the circular NA ranges from about 250 base pairs up to about 250,000 base pairs (i.e., 250 bp to 250,000 bp). In some embodiments, the circular NA is between 250 and 1000 bp. In some embodiments, the circular NA is between 1000 and 10,000 bp. In some embodiments, the circular NA is between 10,000 and 25,000 bp. In some embodiments, the circular NA is between 25,000 bp and 50,000 bp. In some embodiments, the circular NA is between 50,000 bp and 75,000 bp. In some embodiments, the circular NA is between 75,000 bp and 100,000 bp. In some embodiments, the circular NA is between 100,000 bp and 125,000 bp. In some embodiments, the circular NA is between 125,000 bp and 150,000 bp. In some embodiments, the circular NA is between 150,000 bp and 175,000 bp. In some embodiments, the circular NA is between 175,000 bp and 200,000 bp. In some embodiments, the circular NA is between 200,000 bp and 225,000 bp. In some embodiments, the circular NA is between 225,000 bp and 250,000 bp.

In some embodiments, the circular NA is about 500 bp. In some embodiments, the circular NA is about 1,000 bp. In some embodiments, the circular NA is about 1,100 bp. In some embodiments, the circular NA is about 1,200 bp. In some embodiments, the circular NA is about 1,300 bp. In some embodiments, the circular NA is about 1,400 bp. In some embodiments, the circular NA is about 1,500 bp. In some embodiments, the circular NA is about 1,600 bp. In some embodiments, the circular NA is about 1,700 bp. In some embodiments, the circular NA is about 1,800 bp. In some embodiments, the circular NA is about 1,900 bp. In some embodiments, the circular NA is about 2,000 bp. In some embodiments, the circular NA is about 2,200 bp. In some embodiments, the circular NA is about 2,400 bp. In some embodiments, the circular NA is about 2,600 bp. In some embodiments, the circular NA is about 2,800 bp. In some embodiments, the circular NA is about 3,000 bp. In some embodiments, the circular NA is about 3,300 bp. In some embodiments, the circular NA is about 3,600 bp. In some embodiments, the circular NA is about 3,900 bp. In some embodiments, the circular NA is about 4,000 bp. In some embodiments, the circular NA is about 4,400 bp. In some embodiments, the circular NA is about 4,800 bp. In some embodiments, the circular NA is about 5,000 bp. In some embodiments, the circular NA is about 5,500 bp. In some embodiments, the circular NA is about 10,000 bp. In some embodiments, the circular NA is about 11,000 bp. In some embodiments, the circular NA is about 12,000 bp. In some embodiments, the circular NA is about 13,000 bp. In some embodiments, the circular NA is about 14,000 bp. In some embodiments, the circular NA is about 15,000 bp. In some embodiments, the circular NA is about 16,000 bp. In some embodiments, the circular NA is about 17,000 bp. In some embodiments, the circular NA is about 18,000 bp. In some embodiments, the circular NA is about 19,000 bp. In some embodiments, the circular NA is about 20,000 bp. In some embodiments, the circular NA is about 22,000 bp. In some embodiments, the circular NA is about 24,000 bp. In some embodiments, the circular NA is about 25,000 bp. In some embodiments, the circular NA is about 27,500 bp. In some embodiments, the circular NA is about 30,000 bp. In some embodiments, the circular NA is about 32,000 bp. In some embodiments, the circular NA is about 34,000 bp. In some embodiments, the circular NA is about 36,000 bp. In some embodiments, the circular NA is about 38,000 bp. In some embodiments, the circular NA is about 40,000 bp. In some embodiments, the circular NA is about 44,000 bp. In some embodiments, the circular NA is about 48,000 bp. In some embodiments, the circular NA is about 50,000 bp. In some embodiments, the circular NA is about 55,000 bp. In some embodiments, the circular NA is about 60,000 bp. In some embodiments, the circular NA is about 65,000 bp. In some embodiments, the circular NA is about 70,000 bp. In some embodiments, the circular NA is about 75,000 bp. In some embodiments, the circular NA is about 80,000 bp. In some embodiments, the circular NA is about 85,000 bp. In some embodiments, the circular NA is about 90,000 bp. In some embodiments, the circular NA is about 95,000 bp. In some embodiments, the circular NA is about 100,000 bp. In some embodiments, the circular NA is about 110,000 bp. In some embodiments, the circular NA is about 120,000 bp. In some embodiments, the circular NA is about 125,000 bp. In some embodiments, the circular NA is about 130,000 bp. In some embodiments, the circular NA is about 135,000 bp. In some embodiments, the circular NA is about 140,000 bp. In some embodiments, the circular NA is about 145,000 bp. In some embodiments, the circular NA is about 150,000 bp. In some embodiments, the circular NA is about 160,000 bp. In some embodiments, the circular NA is about 170,000 bp. In some embodiments, the circular NA is about 175,000 bp. In some embodiments, the circular NA is about 180,000 bp. In some embodiments, the circular NA is about 190,000 bp. In some embodiments, the circular NA is about 200,000 bp. In some embodiments, the circular NA is about 210,000 bp. In some embodiments, the circular NA is about 220,000 bp. In some embodiments, the circular NA is about 225,000 bp. In some embodiments, the circular NA is about 230,000 bp. In some embodiments, the circular NA is about 240,000 bp. In some embodiments, the circular NA is about 250,000 bp.

Synthetic Nucleic Acid Amplification

A typical protocol for amplifying a synthetic fragment of NA involves using methods such as polymerase chain reaction ("PCR") to amplify a target DNA fragment. In vitro amplification by PCR has been used successfully in the laboratory since the mid-1980s, and while PCR is fast and affordable, it relies on quick thermal cycling, which is impractical for large scale applications. Nevertheless, to continue its amplification, a PCR product may then be ligated into a suitable vector, which is then transformed into host cells, such as bacteria or yeast cells, for amplification in vivo. After transformation, a clone (an individual colony of cells derived from one cell) is identified which expresses the vector containing the desired target DNA fragment. Typically, such a positive clone is identified by screening many colonies (at least tens, possibly hundreds) for the presence of the vector with the target DNA fragment. The screening is typically performed by restriction mapping, and DNA sequencing may be used to verify the integrity of the vector and the presence of the complete target DNA fragment. This process is time consuming, labor intensive, requires the design and production of very specific DNA primer sequences, and provides multiple opportunities for mutagenesis to occur.

Once a clone has been selected containing the vector with the target DNA fragment, cells from this clone are expanded. As the cells of the selected clone multiply, the vector is amplified. The amplified vector containing the target DNA fragment is then recovered from the cells. When recovering the amplified DNA, there are often problems associated with separating the amplified NA from the cells and unwanted cellular components. Although numerous methods have been devised over the years for such purification, they remain time consuming and ineffective (that is, cellular contaminants often remain with the isolated NA).

Rolling Circle Amplification

In nature, the replication of circular DNA, including plasmids and some viral genomes, frequently occurs by rolling circle amplification ("RCA"), whereby the circular DNA template is replicated into a long, linear concatemer (e.g., amplicons) of tandem repeats. This process may also be performed on a circular RNA template. Provided herein is an optimized in vitro RCA system for use in a cell-free system for large-scale NA production, using streamlined templates, highly specific or random primers, and polymerases.

The term RCA describes the ability of RCA-type polymerases (also referred to herein as RCA polymerases) to continuously progress around a circular NA template (DNA or RNA) while extending a hybridized primer. This leads to the formation of linear, single-stranded products with multiple repeats of amplified NA. These linear single-stranded products serve as the basis for multiple hybridization, primer extension and strand displacement events, resulting in formation of concatemeric NA products, again comprising multiple repeats of amplified DNA. There are thus multiple copies of each amplified "single unit" NA molecules in the concatemeric NA products. RCA polymerases are particularly preferred for use in the methods disclosed herein. The products of RCA-type strand displacement replication processes conventionally require complex processing to release single unit NAs.

Most of the RCA technology to date has utilized the Phi29 DNA polymerase, although other polymerases may be used. This is because Phi29 polymerase is highly processive, which enables it to synthesize long concatemers of NA quickly, and has a strand displacement activity, which enables it to continuously synthesize new NA sequences while displacing any secondary primers it encounters. In addition, it can produce large amounts of NA in a relatively short period of time without thermal cycling. Moreover, Phi29 polymerase has an extremely low average error rate, and can use RNA or DNA as a template.

An RCA reaction can utilize either a single-stranded NA template or a double-stranded NA template. In some embodiments, a modified plasmid lacking typical genetic sequences needed for plasmid selection and replication in bacteria is used as a template. Any vector template can be used. In some embodiments, a template may be a circular expression cassette comprising at least one heterologous gene of interest flanked by genetic elements needed for expression and processing of the expressed product in a target cell (e.g., promoters, poly-A tail, etc.). Although the methods disclosed herein can be used to amplify genes from conventional plasmids, streamlined templates having no extra genetic sequences offer multiple benefits: they eliminate extraneous sequences that may inadvertently silence the expression of the heterologous gene of interest; the smaller construct is more compact and can be more efficiently taken up by the target cell, leading to higher transfection efficiency; and it is more cost effective due to lower production requirements of the shorter expression cassette, a statistical increase in fidelity of the final product, and decreased need for extensive purification.

Although most RCA techniques use Phi29 DNA polymerase, it is envisioned that the disclosed methods are not limited to use of Phi29 DNA polymerase. For example, U.S. Pat. Nos. 6,576,448 and 6,235,502 disclose the use of bacterial DNA polymerase III in RCA. DNA polymerase III reportedly has a clamp-like activity that provides a rate of DNA synthesis of about 700-800 nucleotides per second, which may be optimized by adding helicases or stabilizing proteins. In addition, bacterial DNA polymerase I has also been used in RCA to amplify templates. DNA polymerase I uses predominantly single-stranded templates, allowing small circular templates to be readily formed without steric hindrance, a problem often associated with replication of extremely short double-stranded templates. U.S. Pat. No. 5,614,365 discloses a modified DNA polymerase I that includes a sequence from T7 DNA polymerase to increase its efficiency by up to 500-fold. This polymerase has a reduced ability to discriminate between deoxy- and dideoxy-nucleotides. Other DNA polymerases useful in the methods disclosed herein include M2 DNA polymerase, B103 DNA polymerase, GA-1 DNA polymerase, phi-PRD1 polymerase, VENT DNA polymerase, DEEP VENT DNA polymerase, KlenTaq DNA polymerase, Klenow fragment of DNA polymerase I, DNA polymerase III, T3 DNA polymerase, T4 DNA polymerase, T5 DNA polymerase, T7 DNA polymerase, Bst polymerase, rBST DNA polymerase, N29 DNA polymerase, TopoTaq DNA polymerase, T7 RNA polymerase, SP6 RNA polymerase, T3 RNA polymerase, Reverse Transcriptase and derivatives thereof. Some embodiments of the methods disclosed herein use processive, strand-displacing polymerases, such as Phi29-like polymerases (such as those found in Phi29-like phages; see, e.g., Microbiol Mol Biol Rev. 2001 June; 65(2): 261-287), to efficiently amplify templates without thermal cycling. Preferred embodiments use Phi29 or Phi29-like polymerases, but other polymerases such as Pol I and Pol III, T7 DNA polymerase, and their derivatives may also be used.

To allow for amplification according to the methods disclosed herein, it is preferred that the NA template is also contacted with one or more DNA or RNA primers. The primers may be non-specific (i.e., random in sequence) or may be specific for one or more sequences comprised within the NA template. It is preferred that the primers are of random sequence so as to allow for non-specific initiation at any site on the NA template. This allows for high efficiency amplification through multiple initiation reactions from each template strand. Examples of random primers are hexamers, heptamers, octamers, nonamers, decamers or sequences greater in length, for example of 11, 12, 13, 14, 15, 16, 17, 18, 19, 20, 21, 22, 23, 24, 25, 26, 27, 28, 29, or 30 nucleotides in length. A random primer may be of 6 to 30, 8 to 30 or 12 to 30 nucleotides in length. Random primers are typically provided as a mix of oligonucleotides which are representative of all potential combinations of polymers (e.g., hexamers, heptamers, octamers or nonamers, etc.) in the NA template.

In other embodiments, the NA primers are specific. As used herein, specific NA primers are those have a sequence which is at least 80% complementary to a sequence in the template from which initiation of amplification is desired. In this embodiment, a pair of primers may be used to specifically amplify a portion of the template which is internal to the two primer binding sites. Primers may be unlabeled, or may comprise one or more labels, such as radionuclides or fluorescent molecules. In some embodiments, the primers comprise chemically modified nucleotides. Primer lengths/sequences may typically be selected based on hybridization temperature considerations, i.e., as being able to bind to the template at the temperature used in the amplification step.

The contacting of the NA template with the RCA polymerase and one or more primers takes place under conditions promoting hybridization of primers to the template. The conditions include the presence of single-stranded NA allowing for hybridization of the primers. In some embodiments, the single-stranded NA is provided by denaturing a double-stranded NA through any method known in the art (e.g., incubation at a temperature above 80° C.). The conditions also include a temperature and buffer that promote hybridization of the primer to the template. Appropriate hybridization conditions may be selected depending on the properties of the primer. An example of preferred hybridization conditions used in the methods disclosed herein include a buffer 30 mM Tris-HCl pH=7.5, 20 mM KCl, 8 mM $MgCl_2$. The hybridization may be carried out following denaturation by gradual cooling to the desired reaction temperature.

Once the NA template is contacted with the polymerase and one or more primers, there is then a step of incubation under conditions promoting amplification of said template. Preferably, the conditions promote amplification of said template by displacement of replicated strands through strand displacement replication of another strand. The conditions comprise use of any temperature allowing for amplification of NA, commonly in the range of 20 to 90° C. A preferred temperature range may be about 20 to about 40° C., or about 25 to about 35° C. Typically, an appropriate temperature is selected based on the temperature at which a specific polymerase has optimal activity. This information is commonly available and forms part of the general knowledge of the skilled person. For example, a suitable temperature range for Phi29 DNA polymerase would be about 25 to about 35° C., preferably about 30° C. The skilled person would routinely be able to identify a suitable temperature for efficient amplification in the methods disclosed herein. For example, the process could be carried out at a range of temperatures, and yields of amplified NA could be monitored to identify an optimal temperature range for a given polymerase.

Other conditions promoting amplification of the template comprise the presence of a polymerase and one or more primers. The conditions also include the presence of dNTPs (dATP, dTTP, dCTP and dGTP) or NTPs (ATP, UTP, GTP, and CTP), suitable buffering agents/pH and other factors which are required for enzyme performance or stability. Suitable conditions include any conditions used to provide for activity of polymerase enzymes known in the art.

For example, the pH may be within the range of 3 to 10, preferably 5 to 8 or about 7, such as about 7.5. pH may be maintained in this range by use of one or more buffering agents. Such buffers include, but are not restricted to MES, Bis-Tris, ADA, ACES, PIPES, MOBS, MOPS, MOPSO, Bis-Tris Propane, BES, TES, HEPES, DIPSO, TAPSO, Trizma, HEPPSO, POPSO, TEA, EPPS, Tricine, Gly-Gly, Bicine, HEPBS, TAPS, AMPD, TABS, AMPSO, CHES, CAPSO, AMP, CAPS, CABS, phosphate, citric acid-sodium hydrogen phosphate, citric acid-sodium citrate, sodium acetate-acetic acid, imidazole and sodium carbonate-sodium bicarbonate. The reaction may also comprise salts of divalent metals such as, but not limited to, salts of magnesium ($Mg^{2+}$) and manganese ($Mn^{2+}$), including chlorides, acetates and sulfates. Salts of monovalent metals may also be included, such as salts of sodium ($Na^-$) and potassium ($K^+$), for example potassium chloride. Other salts that may be included are ammonium salts, in particular ammonium sulfate.

Detergents may also be included. Examples of suitable detergents include Triton™ X-100 (octoxynol), TWEEN® 20 (polyethylene glycol sorbitan monolaurate), and derivatives of either thereof. Stabilizing agents may also be included in the reaction. Any suitable stabilizing agent may be used; in particular, bovine serum albumin (BSA) and other stabilizing proteins are useful in the methods disclosed herein. Reaction conditions may also be improved by adding agents that relax NA coiling and make template denaturation easier. Such agents include, for example, dimethyl sulfoxide (DMSO), formamide, glycerol, and betaine.

The specific concentrations of particular agents may be selected on the basis of previous examples in the art and further optimized to suit particular requirements. As an example, a suitable reaction buffer used in RCA-based methods in the art comprises 50 mM Tris HCl, pH=7.5, 10 mM MgCl$_2$, 20 mM (NH$_4$)$_2$SO$_4$, 5% glycerol, 0.2 mM BSA, and 1 mM dNTPs. A preferred reaction buffer used in the RCA amplification in the methods disclosed herein comprises 35 mM Tris-HCl, 50 mM KCl, 14 mM MgCl$_2$, 10 mM (NH$_4$)$_2$SO$_4$, 4 mM DTT, and 1 mM dNTP. This buffer is particularly suitable for use with Phi29 RCA polymerase.

Ligation Reaction

The methods herein comprise generating closed circular NA from linear concatemer molecules. Ligases are a class of enzymes that catalyze the formation of a phosphodiester bond between the 3'-OH and 5'-phosphate groups of NA strands, covalently binding two NA molecules together, or circularizing a single NA molecule. In one aspect, linearized NA following the first endonuclease digestion is contacted with at least one ligase enzyme under conditions promoting a ligation reaction. In some embodiments, the ligase enzyme used in T4 DNA Ligase. Other ligase enzymes useful in the methods disclosed herein include, but are not limited to T4 RNA Ligase, T3 DNA Ligase, T7 DNA Ligase, Taq DNA Ligase, or *E. coli* DNA Ligase.

An important feature of the synthetic NA production process described herein is the volume of the ligation reaction. As the concentration of NA in the ligation reaction decreases, the reaction promotes the formation of monomeric circular NA (via intramolecular self-ligation) as opposed to high molecular weight polymers (via intermolecular ligation). A method to maintain low concentration of linear NA in a ligation reaction is to stagger the addition of the template NA into the reaction, which allows for separation of the total reaction NA (linear and circular NA) from that which is input into the reaction (linear NA only). As the linear NA in the reaction is circularized, the concentration of linear NA drops, and more can be added while maintaining a low concentration. A method known as Step-by-Step (SBS) ligation has been described in the art to keep linear template DNA low during a ligation reaction. The SBS method comprises adding very small (<100 bp) linear ssDNA molecules to a reaction buffer intermittently in periods of 20 minutes over a total of 2 hours. However, when applied to dsDNA molecules of substantial size (>250 bp), the SBS method proved to be only modestly better than traditional ligation (See FIG. 5A).

Consequently, a novel method was developed and applied to the methods herein which allows for high production of monomeric ligation products using a linear dsDNA template: Substrate Continually Added Method (SCAM). SCAM comprises adding linear NA to a ligation reaction in a slow, continuous fashion. In some embodiments, the addition of the linear NA is performed using a pump (e.g., a syringe pump or peristaltic pump). In some embodiments, SCAM is performed in a tube, such as a 50 mL conical tube. In some embodiments, SCAM is performed in a larger vessel, such as a flask (e.g., an Erlenmeyer flask), such as a 125 mL flask.

In some embodiments, the first digestion product is added to the ligation reaction mixture at a rate of about 1% to about 20% of a final ligation reaction volume per hour over a 5-14-hour period. In some embodiments, it is added at a rate of about 2% to about 20%, or about 3% to about 20%, or about 4% to about 20%, or about 5% to about 20%, or about 6% to about 20%, or about 7% to about 20%, or about 8% to about 20%, or about 9% to about 20%, or about 10% to about 20%, or about 11% to about 20%, or about 12% to about 20%, or about 13% to about 20%, or about 14% to about 20%, or about 15% to about 20%, or about 16% to about 20%, or about 17% to about 20%, or about 18% to about 20%, or about 19% to about 20%, or about 1% to about 19%, or about 2% to about 19%, or about 3% to about 19%, or about 4% to about 19%, or about 5% to about 19%, or about 6% to about 19%, or about 7% to about 19%, or about 8% to about 19%, or about 9% to about 19%, or about 10% to about 19%, or about 11% to about 19%, or about 12% to about 19%, or about 13% to about 19%, or about 14% to about 19%, or about 15% to about 19%, or about 16% to about 19%, or about 17% to about 19%, or about 18% to about 19%, or about 1% to about 18%, or about 2% to about 18%, or about 3% to about 18%, or about 4% to about 18%, or about 5% to about 18%, or about 6% to about 18%, or about 7% to about 18%, or about 8% to about 18%, or about 9% to about 18%, or about 10% to about 18%, or about 11% to about 18%, or about 12% to about 18%, or about 13% to about 18%, or about 14% to about 18%, or about 15% to about 18%, or about 16% to about 18%, or about 17% to about 18%, or about 1% to about 17%, or about 2% to about 17%, or about 3% to about 17%, or about 4% to about 17%, or about 5% to about 17%, or about 6% to about 17%, or about 7% to about 17%, or about 8% to about 17%, or about 9% to about 17%, or about 10% to about 17%, or about 11% to about 17%, or about 12% to about 17%, or about 13% to about 17%, or about 14% to about 17%, or about 15% to about 17%, or about 16% to about 17%, or about 1% to about 16%, or about 2% to about 16%, or about 3% to about 16%, or about 4% to about 16%, or about 5% to about 16%, or about 6% to about 16%, or about 7% to about 16%, or about 8% to about 16%, or about 9% to about 16%, or about 10% to about 16%, or about 11% to about 16%, or about 12% to about 16%, or about 13% to about 16%, or about 14% to about 16%, or about 15% to about 16%, or about 1% to about 15%, or about 2% to about 15%, or about 3% to about 15%, or about 4% to about 15%, or about 5% to about 15%, or about 6% to about 15%, or about 7% to about 15%, or about 8% to about 15%, or about 9% to about 15%, or about 10% to about 15%, or about 11% to about 15%, or about 12% to about 15%, or about 13% to about 15%, or about 14% to about 15%, or about 1% to about 14%, or about 2% to about 14%, or about 3% to about 14%, or about 4% to about 14%, or about 5% to about 14%, or about 6% to about 14%, or about 7% to about 14%, or about 8% to about 14%, or about 9% to about 14%, or about 10% to about 14%, or about 11% to about 14%, or about 12% to about 14%, or about 13% to about 14%, or about 1% to about 13%, or about 2% to about 13%, or about 3% to about 13%, or about 4% to about 13%, or about 4% to about 13%, or about 13%, or about 5% to about 13%, or about 6% to about 13%, or about 7% to about 13%, or about 8% to about 13%, or about 9% to about 13%, or about 10% to about 13%, or about 11% to about 13%, or about 12% to about 13%, or about 1% to about 12%, or about 2% to about 12%, or about 3% to about 12%, or about 4% to about 12%, or about 5% to about 12%, or about 6% to about 12%, or about 7% to about 12%, or about 8% to about 12%, or about 9% to about 12%, or about 10% to about 12%, or about 11% to about 12%, or about 1% to about 11%, or about 2% to about 11%, or about 3% to about 11%, or about 4% to about 11%, or about 5% to about 11%, or about 6% to about 11%, or about 7% to about 11%, or about 8% to about 11%, or about 9% to about 11%, or about 10% to about 11%, or about 1% to about 10%, or about 2% to about 10%, or about 3% to about 10%, or about 4% to about 10%, or about 5% to about 10%, or about 6% to about 10%, or about 7% to about 10%, or about 8% to about 10%, or about 9% to about 10%, or about 1% to about 9% or about 2% to about 9%, or about 3% to about 9%, or about 4% to about 9%, or about 5% to about 9%, or about 6% to about 9%, or about 7% to about 9%, or about 8% to about 9%, or about 1% to about 8%, or about 2% to about 8%, or about 3% to about 8%, or about 4% to about 8%, or about 5% to about 8%, or about 6% to about 8%, or about 7% to about 8%, or about 1% to about 7%, or about 2% to about 7%, or about 3% to about 7%, or about 4% to about 7%, or about 5% to about 7%, or about 6% to about 7%, or about 1% to about 6%, or about 2% to about 6%, or about 3% to about 6%, or about 4% to about 6%, or about 5% to about 6%, or about 1% to about 5%, or about 2% to about 5%, or about 3% to about 5%, or about 4% to about 5%, or about 1% to about 4%, or about 2% to about 4%, or about 3% to about 4%, or about 1% to about 3%, or about 2% to about 3%, or about 1% to about 2% of a final ligation reaction volume per hour.

In some embodiments, the first digestion product is added to the ligation reaction mixture over a 6-14-hour period, or a 7-14-hour period, or a 8-14-hour period, or a 9-14-hour period, or a 10-14-hour period, or a 11-14-hour period, or a 12-14-hour period, or a 13-14-hour period, or a 5-13-hour period, or a 6-13-hour period, or a 7-13-hour period, or a 8-13-hour period, or a 9-13-hour period, or a 10-13-hour period, or a 11-13-hour period, or a 12-13-hour period, or a 5-12-hour period, or a 6-12-hour period, or a 7-12-hour period, or a 8-12-hour period, or a 9-12-hour period, or a 10-12-hour period, or a 11-12-hour period, or a 5-11-hour period, or a 6-11-hour period, or a 7-11-hour period, or a 8-11-hour period, or a 9-11-hour period or a 10-11-hour period, or a 5-10-hour period, or a 6-10-hour period, or a 7-10-hour period, or a 8-10-hour period, or a 9-10-hour period, or a 5-9-hour period, or a 6-9-hour period, or a 7-9-hour period, or a 8-9-hour period, or a 5-8-hour period, or a 6-8-hour period, or a 7-8-hour period, or a 5-7-hour period, or a 5-6-hour period. In some embodiments, the first digestion product is added to the ligation reaction mixture over a period of about 3 hours, about 4 hours, about 5 hours, about 6 hours, about 7 hours, about 8 hours, about 9 hours, about 10 hours, about 11 hours, about 12 hours, about 13 hours, or about 14 hours, or more. Preferably, the first digestion product is added to the ligation reaction mixture at a rate of about 3% to about 5% of a final ligation reaction volume per hour over a 10-12-hour period.

Endonuclease, Topoisomerase, and Exonuclease Enzymes, and Nucleic Acid Purification In some embodiments, the methods disclosed herein comprise processing steps that utilize endonuclease enzymes to separate NA molecules, leading to the production of a plurality of nucleotide units. Endonucleases are a class of enzymes that cleave phosphodiester bonds within polynucleotide strands, which can facilitate the separation of NA molecules as described further herein. Distinct families of endonucleases have different requirements for the initiation of cleavage. For example, DNase I family endonucleases cut DNA nonspecifically, meaning they will cleave DNA at essentially any double-stranded location. Alternatively, restriction endonucleases contain domains that recognize very specific nucleotide sequences, and thus only cleave at those particular sites. Restriction endonucleases or other sequence-specific endonucleases are preferred for use in the methods disclosed herein. Categories of endonuclease enzymes useful in the methods disclosed herein include, but are not limited to Type I restriction endonucleases, Type II restriction endonucleases, Type IIs restriction endonucleases, Type III restriction endonucleases, Endonuclease III, Endonuclease IV, Endonuclease V, Endonuclease VIII, T7 Endonuclease I, T4 Endonuclease V, T4 Endonuclease VII, Deoxyribonuclease I, Deoxyribonuclease II, Deoxyribonuclease III, Deoxyribonuclease IV, and RNA endonucleases, including engineered RNA endonucleases with customized sequence specificities. Other sequence-specific endonucleases that may be used include RNA-directed endonucleases, such as any of the CRISPR/Cas endonucleases (and similar endonucleases, e.g., Cas9, Cpf1, etc.).

In some embodiments, to ensure that endonuclease enzymes do not continue to cut NA molecules after a digestion reaction is complete, methods are used to render the endonuclease enzymes inactive. A common method of enzyme inactivation is to heat the reaction solution containing the enzyme to a temperature that promotes protein denaturation, e.g., $\geq 65°$ C. for $\geq 15$ minutes. Such high temperatures can damage important protein domains and change the shape of an enzyme such that its substrate cannot fit into the active site, thus inactivating it. Another method is to change the pH of the reaction solution containing the enzyme to a pH which alters hydrogen bonding and salt bridge interactions in a protein's tertiary structure, likewise inactivating it. In some embodiments, the methods herein comprise inactivating the endonuclease enzyme after the endonuclease reaction is complete. In some embodiments, the endonuclease enzyme is inactivated by heat inactivation, e.g., heating the reaction solution to $\geq 65°$ C. for $\geq 15$ minutes. In some embodiments, the endonuclease enzyme is inactivated by altering the pH of the reaction solution through the addition of an acid or base. In some embodiments, hydrochloric acid (HCl) is used to lower the pH of the reaction solution, and sodium hydroxide (NaOH) is used to increase the pH of the reaction solution following inactivation. Other acids and bases that may be used include, but are not limited to, acetic acid ($C_2H_4O_2$), boric acid ($H_3BO_3$), citric acid ($C_6H_8O_7$), nitric acid ($HNO_3$), sulfuric acid ($H_2SO_4$), calcium hydroxide ($Ca(OH)_2$), ammonia ($NH_3$), sodium bicarbonate ($NaHCO_3$) or sodium carbonate ($Na_2CO_3$).

The structure of closed-end NA molecules, including circular NA molecules such as the ligation product described herein, promotes the occurrence of NA supercoiling. Supercoiling is a property of closed-end NA caused by tight topological coupling between the superhelical and double-helical structures of NA, resulting in structurally compact molecules. Due to their inherent physical properties, supercoiling often occurs in closed-end NA molecules. When in a circular conformation, the primary coiled structure of a double-helical NA promotes further coiling into a supercoiled structure. In some embodiments, the methods herein generate a supercoiled product by ligating the monomeric insert sequences.

In some embodiments, the circular ligation product is at least partially supercoiled, e.g., at least 5%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 91%, at least 92%, at least 93%, at least 94%, at least 95%, at least 96%, at least 97%, at least 98%, at least 99%, or even 100% supercoiled.

In some embodiments, the methods herein comprise generating further supercoiled NA from open-circle NA through an enzymatic reaction. Not uncommonly, cellular processes such as replication, transcription, recombination, and reorganization result in topological alterations of NA, leading to issues in the twisting of NA, which can be addressed through the action of topoisomerase enzymes. In vitro, topoisomerase enzymes are useful as they have the ability alter the topological state of DNA and RNA. DNA Topoisomerases, for example, introduce temporary single-stranded (Type I) or double-stranded (Type II) breaks in the phosphate backbone of DNA to allow for positive or negative supercoiling (more or less tightly wound). By contacting NA with topoisomerase enzymes in vitro, it is possible to synthetically dictate the supercoiled state of the NA. In some embodiments, the topoisomerase used is DNA Gyrase. In some embodiments, the topoisomerase used is *E. coli* DNA Gyrase. Other topoisomerase enzymes useful in the methods disclosed herein include, but are not limited to Cre Recombinase, *S. aureus* DNA Gyrase, DNA topoisomerase 2-alpha, or DNA topoisomerase 2-beta.

In some embodiments, the methods herein comprise utilizing an exonuclease enzyme to remove linear and open-circle NA from the supercoiled product. Exonucleases are a class of enzymes that work by digesting NA strands with open 3' or 5' ends, ultimately resulting in the elimination of these strands. In the present disclosure, an exonuclease enzyme may be used in order to further purify the amplified NA product. In some embodiments, the exonuclease used in T5 exonuclease. Other exonuclease enzymes useful in the methods disclosed herein include, but are not limited to Exonuclease I, Exonuclease II, Exonuclease III, Exonuclease IV, Exonuclease V, Exonuclease VIII, Exonuclease T, Lambda Exonuclease, or T7 Exonuclease.

In some embodiments, the methods herein comprise further purifying the amplified NA product using NA purification techniques known in the art. These methods may include, but are not limited to isopropanol precipitation, methanol precipitation, ethanol precipitation, ion-exchange chromatography including anion exchange chromatography, solid phase purification, electrophoresis, affinity chromatography, reverse-phase chromatography, or size exclusion chromatography. As known in the art, certain of the chromatography methods may be carried out as column chromatography or batch chromatography. Combinations of the various purification techniques also can be used.

Definitions

Unless defined otherwise, technical and scientific terms used herein have the same meaning as commonly understood by one of ordinary skill in the art and by reference to published texts, which provide one skilled in the art with a general guide to many of the terms used in the present application. In the event of any conflicting definitions between those set forth herein and those of a referenced publication, the definition provided herein shall control.

A "nucleic acid" (NA) or "polynucleotide," as used herein, refers to an organic molecule comprising two or more covalently bonded nucleotides. A "nucleotide," as used herein, refers to an organic molecule comprising a 1) a nucleoside comprising a sugar covalently bonded to a nitrogenous base (nucleobase); and 2) a phosphate group that is covalently bonded to the sugar of the nucleoside. Nucleotides in a polynucleotide are typically joined by a phosphodiester bond, in which the 3' carbon of the sugar of a first nucleotide is linked to the 5' carbon of the sugar of a second nucleic acid by a bridging phosphate group. Typically, the bridging phosphate comprises two non-bridging oxygen atoms, which are bonded only to a phosphorus atom of the phosphate, and two bridging oxygen atoms, each of which connects the phosphorus atom to either the 3' carbon of the first nucleotide or the 5' carbon of the second nucleotide. In a nucleic acid sequence describing the order of nucleotides in a nucleic acid, a first nucleotide is said to be 5' to (upstream of) a second nucleotide if the 3' carbon of first nucleotide is connected to the 5' carbon of the second nucleotide. Similarly, a second nucleotide is said to be 3' to (downstream of) a first nucleotide if the 5' carbon of the second nucleotide is connected to the 3' carbon of the first nucleotide. Nucleic acid sequences are typically read in 5'→3' order, starting with the 5' nucleotide and ending with the 3' nucleotide.

As used herein, the term "circular NA" or "circular NA vector" refers to a nucleic acid molecule in a circular form. The circular NA may be DNA or RNA. The circular NA vector may be monomeric, dimeric, trimeric, tetrameric, pentameric, hexameric, etc. Preferably, the circular NA vector is monomeric. In other preferred embodiments, the circular NA vector is a monomeric, supercoiled circular DNA molecule. In some embodiments, the NA vector is open circular. In some embodiments, the DNA vector is double-stranded circular. Such a circular forms are typically capable of being amplified into concatemeric linear NA by rolling circle amplification. The term "circular NA vector" is used interchangeable herein with the terms "NA vector," "circular NA molecule," and "covalently closed and circular NA vector." A skilled artisan will understand that such circular vectors may include vectors that are covalently closed with supercoiling and complex DNA topology, as is described herein.

In some embodiments, the NA is a linear NA. A linear NA may be DNA or RNA. A linear NA is an NA with a 5' terminal nucleotide and a 3' terminal nucleotide. The 5' terminal nucleotide of a linear NA is covalently bonded to only one adjacent nucleotide of the NA, with the adjacent nucleotide occurring 3' to the 5' terminal nucleotide in the nucleic acid sequence of the NA. The 3' terminal nucleotide of a linear NA is covalently bonded to only one adjacent nucleotide of the NA, with the adjacent nucleotide occurring 5' to the 3' terminal nucleotide in the nucleic acid sequence of the NA. In a nucleic acid sequence comprising every nucleotide of a linear NA in 5'-to-3' order, the 5' terminal nucleotide is the first nucleotide in the sequence, and the 3' terminal nucleotide is the last nucleotide in the sequence. In some embodiments, a linear NA is self-ligated to produce a circular NA.

An RNA molecule that can be translated is referred to as a messenger RNA, or mRNA. A DNA or RNA sequence encodes a protein through codons. A codon refers to a group of three nucleotides within a nucleic acid, such as DNA or RNA, sequence. An anticodon refers to a group of three nucleotides within a nucleic acid, such as a transfer RNA (tRNA), that are complementary to a codon, such that the codon of a first nucleic acid associates with the anticodon of a second nucleic acid through hydrogen bonding between the bases of the codon and anticodon. For example, the codon 5'-AUG-3' on an mRNA has the corresponding anticodon 3'-UAC-5' on a tRNA. During translation, a tRNA with an anticodon complementary to the codon to be translated associates with the codon on the mRNA, generally to deliver an amino acid that corresponds to the codon to be translated, or to facilitate termination of translation and release of a translated polypeptide from a ribosome.

A "modified nucleotide," as used herein, refers to a nucleotide with a structure that is not the canonical structure of an adenosine nucleotide, cytidine nucleotide, guanine nucleotide, or uracil nucleotide. A canonical structure of a molecule refers to a structure that is generally known in the art to be the structure referred to by the name of the molecule. A canonical structure of an adenosine nucleotide, which comprises an adenine base, ribose sugar, and one or more phosphate groups, is shown below, in the form of adenosine monophosphate:

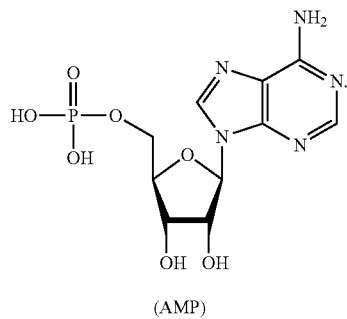

(AMP)

The canonical structure of AMP also refers to structures in which one or more hydroxyl groups of the phosphate and/or one or more hydroxyl groups of the sugar are deprotonated, and structures in which an oxygen atom of the phosphate and/or the 3' oxygen atom of the sugar are bound to an adjacent nucleotide in a nucleic acid sequence.

The canonical structure of a cytosine nucleotide which comprises a cytosine base, ribose sugar, and one or more phosphate groups, is shown below, in the form of cytidine monophosphate:

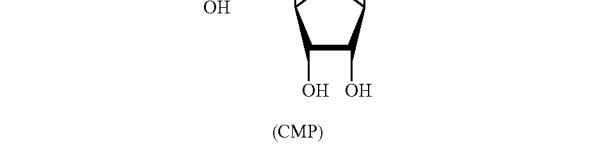

(CMP)

The canonical structure of CMP also refers to structures in which one or more hydroxyl groups of the phosphate and/or one or more hydroxyl groups of the sugar are deprotonated, and structures in which an oxygen atom of the phosphate and/or the 3' oxygen atom of the sugar are bound to an adjacent nucleotide in a nucleic acid sequence.

The canonical structure of a guanine nucleotide which comprises a guanine base, ribose sugar, and one or more phosphate groups, is shown below, in the form of guanosine monophosphate:

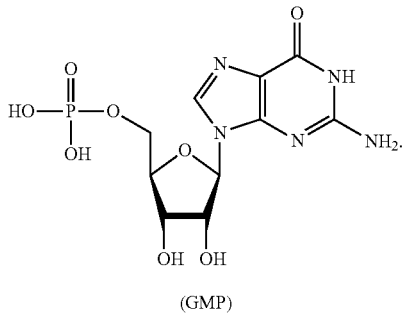

(GMP)

The canonical structure of GMP also refers to structures in which one or more hydroxyl groups of the phosphate and/or one or more hydroxyl groups of the sugar are deprotonated, and structures in which an oxygen atom of the phosphate and/or the 3' oxygen atom of the sugar are bound to an adjacent nucleotide in a nucleic acid sequence.

The canonical structure of a uracil nucleotide which comprises a uracil base, ribose sugar, and one or more phosphate groups, is shown below, in the form of uridine monophosphate:

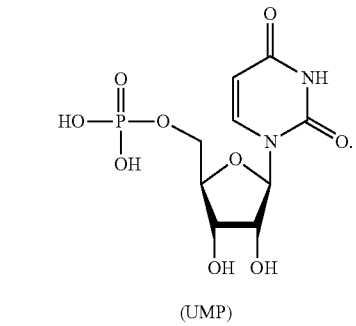

(UMP)

The canonical structure of UMP also refers to structures in which one or more hydroxyl groups of the phosphate and/or one or more hydroxyl groups of the sugar are deprotonated, and structures in which an oxygen atom of the phosphate and/or the 3' oxygen atom of the sugar are bound to an adjacent nucleotide in a nucleic acid sequence.

The structure of a modified nucleotide may differ from the structure of a canonical nucleotide due to one or more modifications in the sugar, nitrogenous base, or phosphate of the nucleotide. In some embodiments, the modified nucleotide comprises a modified nucleoside that is not the canonical structure of an adenine nucleoside, cytosine nucleoside, guanine nucleoside, or uracil nucleoside.

An example of a canonical structure of adenosine, an adenine nucleoside, is reproduced below:

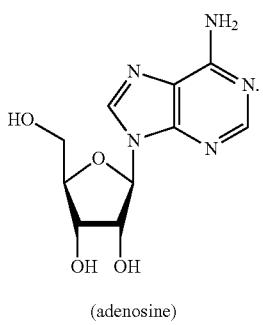

(adenosine)

The canonical structure of adenosine also refers to structures in which one or more hydroxyl groups of the phosphate and/or one or more hydroxyl groups of the sugar are deprotonated, structures in which the 5' carbon is bound to a 5' phosphate in a nucleic acid sequence, and structures in which a 3' oxygen atom is bound to a 5' phosphate group of an adjacent nucleotide in a nucleic acid sequence.

An example of a canonical structure of cytidine, a cytosine nucleoside, is reproduced below:

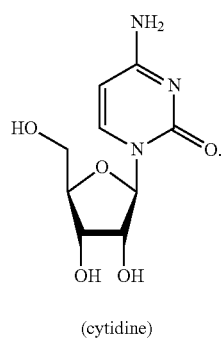

(cytidine)

The canonical structure of cytidine also refers to structures in which one or more hydroxyl groups of the phosphate and/or one or more hydroxyl groups of the sugar are deprotonated, structures in which the 5' carbon is bound to a 5' phosphate in a nucleic acid sequence, and structures in which a 3' oxygen atom is bound to a 5' phosphate group of an adjacent nucleotide in a nucleic acid sequence.

An example of a canonical structure of guanosine, a guanine nucleoside, is reproduced below:

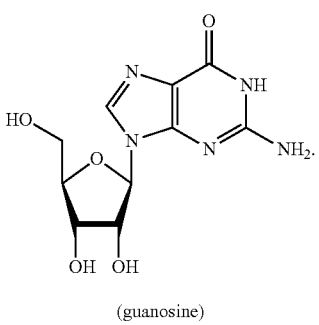

(guanosine)

The canonical structure of guanosine also refers to structures in which one or more hydroxyl groups of the phosphate and/or one or more hydroxyl groups of the sugar are deprotonated, structures in which the 5' carbon is bound to a 5' phosphate in a nucleic acid sequence, and structures in which a 3' oxygen atom is bound to a 5' phosphate group of an adjacent nucleotide in a nucleic acid sequence.

An example of a canonical structure of uridine, a uracil nucleoside, is reproduced below:

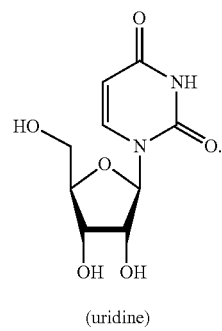

(uridine)

The canonical structure of uridine also refers to structures in which one or more hydroxyl groups of the phosphate and/or one or more hydroxyl groups of the sugar are deprotonated, structures in which the 5' carbon is bound to a 5' phosphate in a nucleic acid sequence, and structures in which a 3' oxygen atom is bound to a 5' phosphate group of an adjacent nucleotide in a nucleic acid sequence.

A "poly-A tail," as used herein, refers to a nucleic acid sequence comprising adenosine nucleotides that is attached to the 3' end of a nucleic acid, such as an RNA. A poly-A tail or poly-A region may consist of nucleotides that are 25-100%, 30-100%, 40-100%, 50-100%, 60-100%, 70-100%, 80-100%, 90-100%, 95-100%, 96-100%, 97-100%, 98-100%, or 99-100% adenosine nucleotides. The adenosine nucleotides comprised by a poly-A tail may be canonical adenosine nucleotides or modified (non-canonical) adenosine nucleotides.

A "ligase," as used herein, refers to an enzyme that is capable of forming a covalent bond between two nucleotides, and the process of "ligation" refers to the formation of the covalent bond between the two nucleotides. As used herein, "concatemer" refers to a NA molecule comprising multiple copies of the same or substantially the same NA sequences (e.g., subunits) that are typically linked in a series.

As used herein, the term "isolated" means artificially produced. In some embodiments, with respect to a NA vector, the term "isolated" refers to a NA vector that is: (i) amplified in vitro (e.g., in a cell-free environment), for example, by rolling-circle amplification or polymerase chain reaction (PCR); (ii) recombinantly produced by molecular cloning; (iii) purified, such as by endonuclease cleavage and gel electrophoretic fractionation, or column chromatography; or (iv) synthesized by, for example, chemical synthesis. An isolated NA vector is one which is readily manipulable by recombinant DNA techniques well-known in the art. Thus, a nucleotide sequence contained in a vector in which 5' and 3' endonuclease sites are known or for which polymerase chain reaction (PCR) primer sequences have been disclosed is considered isolated, but a NA sequence existing in its native state in its natural host is not. An isolated NA vector may be substantially purified, but need not be.

As used herein, a "cell-free method" of producing a NA vector refers to a method that does not rely on containment of any of the NA within a host cell, such as a bacterial (e.g.,

*E. coli*) host cell, to facilitate any step of the method. For example, a cell-free method occurs within one or more synthetic containers (e.g., glass or plastic tubes or other containers) within appropriate solutions (e.g., buffered solutions), to which enzymes and other agents may be added to facilitate NA amplification, modification, and isolation.

As used herein, "vector" refers to a NA molecule capable of carrying a heterologous gene into a target cell in which the heterologous gene can then be replicated, processed, and/or expressed in the target cell.

Translation is the process in which the RNA coding sequence is used to direct the production of a protein. The first step in translation is initiation, in which a ribosome associates with an mRNA, and a first transfer RNA (tRNA) carrying a first amino acid associates with the first codon, or START codon. The next phase of translation, elongation, involves three steps. First, a second tRNA with an anticodon that is complementary to codon following the START codon, or second codon, and carrying a second amino acid, associates with the mRNA. Second, the carbon atom of terminal, non-side chain carboxylic acid moiety of the first amino acid reacts with the nitrogen of the terminal, non-side chain amino moiety of the second amino acid carried, forming a peptide bond between the two amino acids, with the second amino acid being bound to the second tRNA, and the first amino acid bound to the second amino acid, but not the first tRNA. Third, the first tRNA dissociates from the mRNA, and the ribosome advances along the mRNA, such that the position at which the first tRNA associated with the ribosome is now occupied by the second tRNA, and the position previously occupied by the second tRNA is now free for an additional tRNA carrying an additional amino acid to associate with the mRNA. These three steps of 1) association of a tRNA carrying amino acid, 2) formation of a peptide bond, which adds an additional amino acid to a growing polypeptide, and 3) advancement of the ribosome along the mRNA, continue until the ribosome reaches a STOP codon, which results in termination of translation. Generally, tRNAs that associate with STOP codons do not carry an amino acid, so the association of a tRNA that does not carry an amino acid during the elongation step results in cleavage of the bond between the polypeptide and the tRNA carrying the final amino acid in the polypeptide, such that the polypeptide is released from the ribosome. Alternatively, ribosomes may dissociate from the mRNA and release the polypeptide if no tRNA associates with the STOP codon.

As used herein, a "target cell" refers to any cell that expresses or is intended to express a target gene. Vectors can be introduced into target cells that reside in a subject (in situ) or target cells in culture by various methods including electroporation. In some embodiments, target cells are post-mitotic cells. Target cells include both vertebrate and invertebrate animal cells (and cell lines of animal origin). Representative examples of vertebrate cells include mammalian cells, such as humans, rodents (e.g., rats and mice), and ungulates (e.g., cows, goats, sheep, and swine). Alternatively, target cells can be stem cells (e.g., pluripotent cells (i.e., a cell whose descendants can differentiate into several restricted cell types, such as hematopoietic stem cells or other stem cells)) or totipotent cells (i.e., a cell whose descendants can become any cell type in an organism, e.g., embryonic stem cells, and somatic stem cells e.g., hematopoietic cells). In yet other embodiments, target cells include oocytes, eggs, cells of an embryo, zygotes, sperm cells, and somatic (non-stem) mature cells from a variety of organs or tissues, such as hepatocytes, neural cells, muscle cells and blood cells (e.g., lymphocytes).

A "host cell" refers to any cell that harbors a NA vector of interest. A host cell may be used as a recipient of a NA vector as described by the disclosure. The term includes the progeny of the original cell which has been transfected. Thus, a "host cell" as used herein may refer to a cell which has been transfected with a heterologous gene (e.g., by a NA vector described herein), and any of its progeny harboring a NA vector of interest. It is understood that the progeny of a single parental cell may not necessarily be completely identical in morphology or in genomic or total NA complement as the original parent, due to natural, accidental, or deliberate mutation.

The term "heterologous gene" refers to a gene that does not naturally occur in the host or target cell in which it is expressed. For instance, a heterologous gene can be a mammalian gene, e.g., a therapeutic gene (e.g., a gene that encodes a therapeutic protein, such as a therapeutic replacement protein, an antigen-binding protein, etc.), e.g., a mammalian gene that encodes a therapeutic protein. In some embodiments, a heterologous gene encodes a protein or portion thereof that is defective or absent in the target cell and/or subject (e.g., a therapeutic replacement protein). In some embodiments, the heterologous gene contains one or more exons encoding a protein that is defective or absent in the target cell and/or subject. In some embodiments, a heterologous gene includes a therapeutic NA, such as a therapeutic RNA (e.g., microRNA, siRNA, shRNA, or guide RNA compatible with a Cas nuclease system) or a therapeutic DNA (e.g., antisense oligonucleotide, aptamer, or ribozyme).

The term "promoter" refers to a sequence that regulates transcription of a heterologous gene operably linked to the promoter. Promoters provide the sequence sufficient to direct transcription and/or recognition sites for RNA polymerase and other transcription factors required for efficient transcription and can direct cell-specific expression. In addition to the sequence sufficient to direct transcription, a promoter sequence can also include sequences of other regulatory elements that are involved in modulating transcription (e.g., enhancers, Kozak sequences, and introns). Examples of promoters known in the art and useful in the vectors described herein include the CMV promoter, hEF1a promoter, CBA promoter, smCBA promoter, inducible promoters such as TRE and TRE3G, and those promoters derived from an immunoglobulin gene, SV40, or other tissue specific genes. Standard techniques are known in the art for creating functional promoters by mixing and matching known regulatory elements. "Truncated promoters" may also be generated from promoter fragments or by mix and matching fragments of known regulatory elements; for example, the smCBA promoter is a truncated form of the CBA promoter.

An "open reading frame" ("ORF"), such as an ORF encoding a protein, as used herein refers to a nucleic acid sequence comprising a coding sequence that leads to the production of the protein when the ORF is translated. The nucleic acid sequence may be an RNA sequence, in which case translation of the RNA sequence produces a polypeptide with the amino acid sequence of the protein. The nucleic acid sequence may be a DNA sequence, in which case the protein is produced when an RNA polymerase uses the DNA sequence to transcribe an RNA molecule comprising an RNA sequence that is complementary to the DNA sequence, and translation of the RNA sequence produces a polypeptide with the amino acid sequence of the protein. An ORF typically begins with a START codon, such as AUG in the RNA sequence (ATG in the DNA sequence), and ends with a STOP codon, such as UAG, UAA, or UGA in the RNA sequence (TAG, TAA, or TGA in the DNA sequence), with the number of bases between the G of the start codon and the T or U of the STOP codon being a multiple of 3 (e.g., 3, 6, 9, 12, etc.).

In some embodiments of the synthetic circular NAs provided herein, the circular NA comprises a 5' untranslated region (5' UTR) and a 3' untranslated region (3' UTR). 5' and 3' UTRs are sequences within an RNA that do not encode amino acids of the protein encoded by the RNA, and are thus not part of the open reading frame. The 5' UTR is 5' to (upstream of) the open reading frame. The 3' UTR is 3' to (downstream of) the open reading frame. In some embodiments, the 3' UTR comprises one or more nucleotides that are 3' to the open reading frame and 5' to (upstream of) the poly-A region of the RNA.

In some aspects, the present disclosure provides compositions comprising any of the synthetic circular NAs, delivery agents, or cells provided herein. In some embodiments, the composition further comprises one or more additional agents, such as a nucleotide, a nucleic acid, an amino acid, a peptide, a protein, a small molecule, an aptamer, a lipid, or a carbohydrate. In some embodiments, the additional agent has a therapeutic effect when administered to a subject. In some embodiments, the additional agent is an agent for use in modulating the expression and/or activity of one or more gene products (e.g., proteins) in a subject. In some embodiments, the additional agent is a nucleic acid for use in decreasing the expression and/or activity of one or more gene products (e.g., proteins), such as a short hairpin RNA (shRNA), small interfering RNA (siRNA), or an antisense oligonucleotide (ASO). In some embodiments, the additional agent is an inhibitor for decreasing the activity of one or more gene products (e.g., proteins). In some embodiments, the agent is a small molecular inhibitor. In some embodiments, the additional agent is an agent for enhancing an immune response in a subject. In some embodiments, the additional agent is an antigen, such as a nucleic acid antigen, a protein antigen, or a phospholipid antigen. In some embodiments, the additional agent is an adjuvant, such as, for example, aluminum hydroxide or potassium aluminum sulfate (alum), monophosphoryl lipid A (MPL), an oil-in-water emulsion (e.g., a squalene emulsion), a cytosine phosphoguanine (CpG) oligodeoxynucleotide, or another adjuvant that is known in the art. See, e.g., Di Pasquale, A et al. *Vaccines*. 2015. 3(2):320-343. In some embodiments, the composition is a pharmaceutical composition comprising any one of the synthetic circular NAs, delivery agents, or cells provided herein, and a pharmaceutically acceptable excipient. Pharmaceutically acceptable excipients, carriers, buffers, stabilisers, isotonicising agents, preservatives or antioxidants, or other materials well known to those skilled in the art. Such materials should be non-toxic and should not interfere with the efficacy of the active ingredient. The precise nature of the carrier or other material may depend on the route of administration, e.g., parenteral, intramuscular, intradermal, sublingual, buccal, ocular, intranasal, subcutaneous, intrathecal, intratumoral, oral, vaginal, or rectal.

In some aspects, the present disclosure provides a method of administering to a subject any of the synthetic circular NAs, delivery agents, cells, compositions, or pharmaceutical compositions provided herein. In some embodiments, the subject is a human. In some embodiments, the administration is parenteral, intramuscular, intradermal, sublingual, buccal, ocular, intranasal, subcutaneous, intrathecal, intratumoral, oral, vaginal, or rectal. In some embodiments, the composition is to be stored below 50° C., below 40° C., below 30° C., below 20° C., below 10° C., below 0° C., below −10° C., below −20° C., below −30° C., below −40° C., below −50° C., below −60° C., below −70° C., or below −80° C., such that the nucleic acids are relatively stable over time. In some embodiments, the synthetic circular NA is introduced into a cell in a subject by in vivo electroporation. In vivo electroporation is the process of introducing nucleic acids or other molecules into a cell of a subject using a pulse of electricity, which promote passage of the nucleic acids or other molecules through the cell membrane and/or cell wall. See, e.g., Somiari et al. *Molecular Therapy.*, 2000. 2(3):178-187. The synthetic circular NA to be delivered is administered to the subject, such as by injection, and a pulse of electricity is applied to the injection site, whereby the electricity promotes entry of the nucleic acid into cells at the site of administration. In some embodiments, the synthetic circular NA is delivered to and taken up by cells of the subject (e.g., cells local to the site of administration or throughout the subject) via a delivery agent that is associated with (e.g., conjugated to) the synthetic circular NA. In some embodiments, the synthetic circular NA is administered with other elements, such as buffers and/or excipients, that increase the efficiency of electroporation.

The terms "a" and "an" mean "one or more of." For example, "a gene" is understood to represent one or more such genes. As such, the terms "a" and "an," "one or more of a (or an)," and "at least one of a (or an)" are used interchangeably herein.

As used herein, the term "about" refers to a value within ±10% variability from the reference value, unless otherwise specified.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B," when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

Other embodiments of the invention will be apparent to those skilled in the art from consideration of the specification and practice of the invention disclosed herein, it is intended that the specification and examples be considered as exemplary only, with a true scope and spirit of the invention being indicated by the following claims. For any conflict in definitions between various sources or references, the definition provided herein shall control.

EXAMPLES

Example 1: Development of Cell-Free Method of Producing Synthetic Circular Nucleic Acid Using Rolling Circle Amplification FIG. 1 depicts a schematic representation of the process disclosed herein, wherein a starting synthetic circular NA template is amplified via the steps shown. Steps 1-4 may be supplemented with steps 5-7, in which the amplified NA solution is contacted with a topoisomerase enzyme to supercoil it, contacted with an exonuclease to remove linear NA, and further purified for a purer final product. All reaction steps utilize a common buffer with no purification required between steps.

FIGS. 2A-2B depict the process of rolling circle amplification (RCA) using example NA and polymerase. As shown in FIG. 2A, a circular DNA molecule (labeled as Plasmid) may be used as a NA template. 5 μg/mL of the plasmid was incubated with 50 μM random DNA primers, 2 mM dNTP molecules, and 200 U/mL Phi29 DNA Polymerase in a buffer solution, leading to amplification of long, single-stranded concatemers. The DNA primers then bound to the concatemers, and Phi29 Polymerase produced complementary strands, resulting in double-stranded linear DNA products containing a plurality of copies of the starting plasmid sequence. FIG. 2B shows the results of performing RCA on a plasmid for 90 minutes (Lane 2) and for 16 hours (Lane 3). Lane 1 shows a DNA ladder for size reference. Lanes 2 and 3 illustrate the presence of long, double-stranded concatemers that migrated slowly in the gel and stuck in the loading well, with a greater amount of concatemers seen after 16 hours compared to 90 minutes of RCA.

Figure 3B:
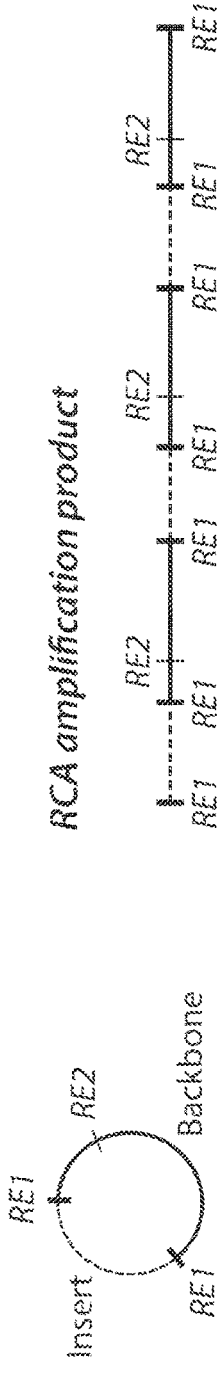
Figure 3C:
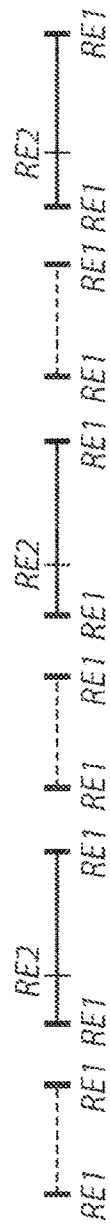
Figure 3D:
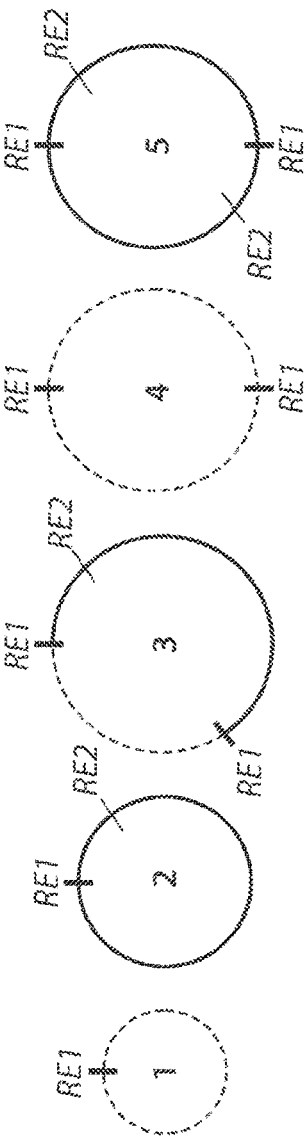

FIGS. 3A-3D depict a schematic representation of amplifying a NA template using the methods provided herein. An example of a starting NA template is shown in FIG. 3A, wherein the circular template contains a backbone sequence, an insert sequence, cut sites at the 5' and 3' ends of the insert sequence (RE1), and an endonuclease cut site within the backbone that does not have the same recognition sequence as RE1 (RE2). In this example, cut sites at the 5' and 3' ends of the insert sequence are the same cut sites, but need not be. Performing RCA on the template results in a linear concatemer as depicted in FIG. 3B (RCA amplification product). The horizontal lines depict the RE1 and RE2 cut sites in the linear concatemer. The RCA amplification product is then contacted with an endonuclease that cuts at RE1, resulting in the linear products shown in FIG. 3C (first digestion product), which contain separate insert and backbone sequences. The insert sequences are flanked by the RE1 cut sites and do not contain the RE2 cut site. The first digestion product is incubated with a ligase enzyme to promote self-ligation, examples of possible products of which are shown in FIG. 3D (ligation product). For example, in some embodiments, a ligation product produced by the methods described herein contains a single copy of the insert (ligation product 1), and in other embodiments it comprises more than one copy of the insert (ligation product 4) (FIGS. 3D, 6A, and 6B). In some embodiments, a ligation product contains a single copy of the backbone (ligation product 2), and in some embodiments it contains more than one copy of the backbone (ligation product 5). In some embodiments, a ligation product comprises at least one insert and at least one backbone (ligation product 3).

A DNA plasmid with a design as shown in FIG. 3A underwent RCA and a first digestion with a first restriction enzyme EcoRI (RE1) before undergoing ligation. The DNA template was slowly added using the SCAM method described herein to a vessel containing T4 DNA Ligase, ATP, common buffer, and water. Slow addition of DNA over the course of 12 hours (substrate continually added method, i.e., SCAM) led to the production of primarily monomeric circular constructs (see FIG. 5). The products of the first digestion and SCAM ligation were run on a DNA agarose gel (Lane 2 and Lane 3, respectively) (FIG. 3E). Lanes 1 and 2 show linear and supercoiled DNA ladders, respectively, for size reference. Lane 2 shows the linear insert and backbone products (higher and lower bands, respectively) following digestion with EcoRI (RE1); Lane 3 shows the DNA species present after self-ligation (possibilities shown in FIG. 3D).

FIGS. 4A-4C show DNA gels demonstrating the inactivation of endonuclease enzymes at a specific pH. To determine the pH at which EcoRI was inactivated, multiple reaction solutions were prepared with all reagents except DNA (i.e., the reaction solutions comprised CutSmart® Buffer [New England BioLabs, proprietary composition], EcoRI, and water). The pH values of the individual solutions were changed using 12% HCl to include pH values from 7.8, 7.0, 6.0, 5.0, 4.0, 3.0, or 2.0. After 5 minutes, the pH of all solutions was reverted to 7.8 with 3M NaOH. 5 minutes later, a circular DNA plasmid template was added to each reaction solution and incubated at 37° C. for 2 hours. FIG. 4A shows the reaction products after the inactivation of EcoRI using the different pH values. pH values from 7.8-5.0 did not inactivate EcoRI; under these pH conditions, EcoRI retained its endonuclease activity, leading to the production of linearized DNA (Lanes 2-5). Lanes 6-8 show that pH values from 4.0-2.0 caused significant inactivation of EcoRI, inhibiting its endonuclease activity and preserving the circular DNA template. Lane 1 shows a linear DNA ladder for size reference. FIG. 4B shows data from a similar experimental setup, but testing HindIII endonuclease inactivation. As in FIG. 4A, pH values of ≤4.0 caused significant inactivation of HindIII endonuclease. Lane 1 shows a DNA ladder for size reference. The sample in Lane 8 was subjected to a pH change (decreased to pH=4.0 with HCl; reversion to pH=7.8 with NaOH), but did not contain HindIII endonuclease. FIG. 4C shows the results of an experiment in which supercoiled DNA (SC, Lane 2) was contacted with HindIII after its inactivation through 3 different methods: heat inactivation at 80° C. for 20 minutes (HI, Lane 3), pH inactivation (pH=4.0, 5 minutes; pH, Lane 4), or a combination of heat and pH (HIpH, Lane 5). The solutions were then fed into ligation reactions containing T4 DNA Ligase and incubated overnight at room temperature before running the product on a gel. Compared to the SC control (Lane 2), the level of linearized plasmid is similar in the endonuclease-inactivated samples (Lanes 3-5), demonstrating that pH inactivation does not appreciably affect ligation reaction efficiency. Lane 1 shows a linear DNA ladder for size reference.

FIGS. 5A-5B show the results of performing ligation reactions using a step-by-step (SBS) method or substrate continuously added method (SCAM). To first test the efficiency of SBS against a traditional ligation reaction, each reaction was run in parallel with the same linear DNA substrate (FIG. 5A). For the traditional ligation reaction, all ligation reagents (T4 DNA Ligase, T4 DNA Ligase Buffer [New England BioLabs, proprietary composition], and DNA) were added to the reaction at the same time and allowed to incubate for 2 hours at room temperature (CTRL). In the SBS sample, all ligation reagents plus 20% of the final DNA volume were added at the start of the reaction. Starting 20 minutes later, 20% of the final DNA volume was added at intervals of 20 minutes at 5 time points with a 20-minute incubation after the addition of the final 20% of DNA, for a total reaction time of 2 hours. Samples were loaded on a DNA gel in triplicate at increasing DNA amounts along with linear and supercoiled DNA ladders for size reference (Lanes 1 and 2, respectively). Comparison between the circular monomer bands in the SBS and traditional ligation lanes revealed a modest increase (50%-70%) in circular monomers when using the SBS method (see Lanes 4, 6 and 8 compared to Lanes 3, 5 and 7). A second experiment was performed to test the ligation efficiency when using SCAM versus a traditional ligation reaction (FIG. 5B). Like in FIG. 5A, a traditional ligation reaction was run in which all ligation reagents were added to the reaction at the same time and allowed to incubate for 20 hours at 25° C. (CTRL, Lane 3). In the SCAM sample, all ligation reagents were first combined to produce a 10 mL initial volume. Then, 10 mL of the DNA substrate was added continuously at a rate of 0.6 mL/hour over 16 hours at 25° C. for a final volume of 20 mL. The reaction was allowed to continue for 4 hours following the addition of the last of the substrate. Samples were loaded on a gel along with linear and supercoiled DNA ladders for size reference (FIG. 5B). Comparison between the circular monomer bands in the SCAM and traditional ligation lanes revealed a significant increase (158%) in the production of circular monomers when using SCAM, demonstrating that SCAM ligation is significantly more effective at producing circular monomer products from dsDNA templates in comparison to SBS and traditional ligation methods (see Lane 4 compared to Lane 3). Note that the DNA constructs used in the experiments depicted in FIG. 5A and FIG. 5B were different. The sizes of the insert and backbone sequences in FIG. 5A were sufficiently different to allow for separation on the gel; the sizes of the insert and backbone sequences in FIG. 5B were similar in size and thus appear as one band on the gel.

While the ligation product from FIG. 3E comprised the desired amplified circular monomer insert sequence (ligation product 1), it also comprised sequences comprising the vector backbone (FIG. 6A, ligation products 2, 3, and 5). FIG. 6B depicts a schematic of linearizing these unwanted backbone-containing products. By contacting the ligation product with an endonuclease that cuts at RE2, any circular products containing the vector backbone are cut, specifically linearizing the unwanted NA sequences (FIG. 6B, second digestion products 2, 3, and 5). As shown in FIGS. 3D, 6A, and 6B, the ligation product may contain a single copy of the insert (ligation product 1) or may comprise more than one copy of the insert (ligation product 4). The numbers in FIGS. 6A and 6B illustrate the products generated from each corresponding digested circular plasmid. FIG. 6C displays a DNA gel run to compare sizes of the ligation product before (Lane 2) and after (Lane 3) a second digestion with XhoI (i.e., RE2), showing a size shift only in DNA products containing the longer vector backbone (the bottom band in Lane 2). Lane 1 shows a linear DNA ladder for size reference.

FIG. 7A depicts a schematic representation of the process of supercoiling a circular NA. Topoisomerase enzymes, which work to alter the topological state of NA, can be contacted with relaxed NAs (shown as the plasmid in FIG. 7A) to promote supercoiling, resulting in a more compact DNA molecule (supercoiled product). The second digestion product from FIG. 6C was contacted with *E. Coli* DNA Gyrase for 2 hours or overnight. FIG. 7B shows a DNA gel that was run to compare sizes of the second digestion product before (Lane 2) and after supercoiling for 2 hours (Lane 3) or overnight (Lane 4). Following supercoiling, the second digestion product migrated through the gel at the same rate as the linearized backbone (XhoI Digest), with the loss of the ladder-like appearance present in Lane 2. Lane 1 shows a DNA ladder for size reference.

FIG. 8A depicts the process of removing unwanted linear DNA from the second digestion product. While the supercoiled product contains the desired circular insert sequences (FIG. 8A, products 1 and 4), it also contains linear backbone-containing products remaining from the second digestion (FIG. 8A, products 2, 3, and 5). To remove these unwanted products, the supercoiled product from FIG. 7B was contacted with an exonuclease enzyme, which digests linear and open-circle NAs. FIG. 8B shows an DNA gel run to compare sizes of the supercoiled product before (Lane 2) and after (Lane 3) digestion with T5 Exonuclease. Linear monomers, multimers, and material trapped in the well of Lane 2 is not present in Lane 3, which primarily contains the supercoiled circular insert. Lane 1 shows a DNA ladder for size reference.

The exonuclease product from FIG. 8B was further purified by anion exchange chromatography followed by isopropanol precipitation. FIG. 9 shows a DNA gel that was run to demonstrate the purity of the supercoiled circular insert that is obtained after performing steps 1-7 of FIG. 1 (see Lane 3). Linear and supercoiled DNA ladders are shown in Lanes 1 and 2, respectively.

EQUIVALENTS

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All references, patents and patent applications disclosed herein are incorporated by reference with respect to the subject matter for which each is cited, which in some cases may encompass the entirety of the document.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03. It should be appreciated that embodiments described in this document using an open-ended transitional phrase (e.g., "comprising") are also contemplated, in alternative embodiments, as "consisting of" and "consisting essentially of" the feature described by the open-ended transitional phrase. For example, if the disclosure describes "a composition comprising A and B," the disclosure also contemplates the alternative embodiments "a composition consisting of A and B" and "a composition consisting essentially of A and B."

What is claimed is:

1. A method of amplifying a synthetic circular nucleic acid, comprising:
    a) providing a circular nucleic acid template comprising:
        (i) a backbone, wherein the backbone comprises one or more internal endonuclease cut sites, and
        (ii) an insert sequence, wherein the insert sequence comprises endonuclease cut sites on its 5' and 3' terminal ends;
    b) amplifying the circular nucleic acid template by rolling circle amplification, thereby producing an amplification product;
    c) contacting the amplification product with a first endonuclease that cuts at the endonuclease cut sites at the 5' and 3' ends of the insert sequence under conditions for digestion, thereby producing a first digestion product;
    d) adding the first digestion product to a ligation reaction mixture comprising a ligase enzyme, wherein the first digestion product is added to the ligation reaction mixture at a rate of about 1% to about 20% of a final ligation reaction volume per hour over a 5 to 14 hour period;
    e) incubating the ligation reaction mixture, thereby producing a circular ligation product, wherein the circular ligation product is at least partially supercoiled;
    f) contacting the circular ligation product with an exonuclease that digests single-stranded nucleic acid, linear nucleic acid, and open circle nucleic acid, thereby producing a final reaction product comprising synthetic circular nucleic acid that is substantially free of linear nucleic acid; and
    g) purifying the final reaction product by ion-exchange chromatography, affinity chromatography, reverse phase chromatography, size exclusion chromatography, isopropanol precipitation, methanol precipitation, ethanol precipitation, solid phase purification, electrophoresis, or combinations thereof.

2. The method of claim 1, wherein the first digestion product is added to the ligation reaction mixture at a rate of about 3% to about 5% of a final ligation reaction volume per hour over a 10 to 12 hour period.

3. The method of claim 1, wherein the circular ligation product is contacted with a second endonuclease targeting a cut site within the backbone under conditions for digestion, thereby producing a second digestion product, wherein the first and second endonucleases do not have the same recognition site.

4. The method of claim 3, further comprising contacting the circular ligation product or the second digestion product with a topoisomerase under conditions that promote supercoiling.

5. The method of claim 4, wherein the topoisomerase is *E. coli* DNA gyrase or *S. aureus* DNA Gyrase.

6. The method of claim 3, further comprising deactivating the first and/or second endonuclease following digestion by decreasing the pH to between 3-5.

7. The method of claim 3, wherein the recognition sites for the first endonuclease at the 5' and 3' terminal ends of the insert sequence are located at the 5' and 3', respectively, of the insert sequence in the circular nucleic acid template; and wherein the and (c) a recognition site of the second endonuclease is located in the backbone of the circular nucleic acid template.

8. The method of claim 3, wherein the first endonuclease or the second endonuclease is a Type II restriction endonuclease, a Type IIs restriction endonuclease, with customized sequence specificity, or a CRISPR/Cas endonuclease.

9. The method of claim 1, wherein the ligase is T4 DNA ligase, T4 RNA Ligase, T3 DNA Ligase, T7 DNA Ligase, Taq DNA Ligase, or *E. coli* DNA Ligase.

10. The method of claim 1, wherein the exonuclease is T5 exonuclease.

11. The method of claim 1, wherein the first endonuclease is a Type II restriction endonuclease, a Type IIs restriction endonuclease, an engineered RNA endonuclease with customized sequence specificity, or a CRISPR/Cas endonuclease.

12. The method of claim 1, wherein the first endonuclease is a Type II restriction endonuclease.

13. A method of amplifying a synthetic circular nucleic acid, comprising:
    a) providing a circular nucleic acid template comprising
        (i) a backbone, wherein the backbone comprises one or more internal endonuclease cut sites, and (ii) an insert sequence, wherein the insert sequence comprises endonuclease cut sites on its 5' and 3' terminal ends;
b) amplifying the circular nucleic acid template by rolling circle amplification, wherein the rolling circle amplification is performed using a Phi29 DNA polymerase, thereby producing an amplification product;
c) contacting the amplification product with a first endonuclease targeting the endonuclease cut sites on the insert sequence, under conditions for digestion, wherein the first endonuclease is a Type II restriction endonuclease, thereby producing a first digestion product;
d) adding the first digestion product to a ligation reaction mixture comprising a T4 DNA ligase wherein the first digestion product is added to the ligation reaction mixture at a rate of about 1% to about 20% of a final ligation reaction volume per hour over a 5-14-hour period;
e) incubating the ligation reaction mixture, thereby producing a circular ligation product;
f) contacting the circular ligation product with a second endonuclease targeting the one or more internal endonuclease cut sites on the backbone, under conditions for digestion, wherein the second endonuclease is a Type II restriction endonuclease, thereby producing a second digestion product, wherein the first and second endonucleases do not have the same recognition site;
g) contacting the second digestion product with a T5 exonuclease that digests single-stranded nucleic acid, linear nucleic acid, and open circle nucleic acid, thereby producing a final reaction product comprising synthetic circular nucleic acid that is substantially free of linear nucleic acid; and
h) purifying the final reaction product by ion-exchange chromatography, wherein the final reaction product is at least partially supercoiled.

\* \* \* \* \*